United States Patent
Kim et al.

(10) Patent No.: US 9,723,592 B2
(45) Date of Patent: Aug. 1, 2017

(54) METHOD AND USER EQUIPMENT FOR TRANSMITTING UPLINK SIGNAL, AND METHOD AND EVOLVED NODE B FOR RECEIVING UPLINK SIGNAL

(71) Applicant: LG ELECTRONICS INC., Seoul (KR)

(72) Inventors: Hakseong Kim, Anyang-si (KR); Hanbyul Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 557 days.

(21) Appl. No.: 14/351,728

(22) PCT Filed: Oct. 15, 2012

(86) PCT No.: PCT/KR2012/008374
§ 371 (c)(1),
(2) Date: Apr. 14, 2014

(87) PCT Pub. No.: WO2013/055174
PCT Pub. Date: Apr. 18, 2013

(65) Prior Publication Data
US 2014/0314031 A1    Oct. 23, 2014

Related U.S. Application Data

(60) Provisional application No. 61/547,015, filed on Oct. 13, 2011, provisional application No. 61/551,899, (Continued)

(51) Int. Cl.
*H04W 4/00* (2009.01)
*H04W 72/04* (2009.01)
(Continued)

(52) U.S. Cl.
CPC ....... *H04W 72/0406* (2013.01); *H04L 1/1861* (2013.01); *H04L 5/001* (2013.01);
(Continued)

(58) Field of Classification Search
CPC .................. H04W 72/0406; H04L 5/0055
(Continued)

(56) References Cited

U.S. PATENT DOCUMENTS

2009/0257390 A1   10/2009   Ji et al.
2011/0243066 A1*  10/2011   Nayeb Nazar .......... H04L 1/007
                                                                370/328

(Continued)

FOREIGN PATENT DOCUMENTS

KR    10-2011-0021621 A    3/2011
KR    10-2011-0104112 A    9/2011
(Continued)

OTHER PUBLICATIONS

3GPP TSG RAN WG1 #62;R1-104582 ;Madrid, Spain, Aug. 23-28, 2010; Source: Samsung ;Title: PUCCH HARQ-ACK Resource Mapping for DL CA).*

(Continued)

*Primary Examiner* — Derrick Ferris
*Assistant Examiner* — Abdeltif Ajid
(74) *Attorney, Agent, or Firm* — Birch, Stewart, Kolasch & Birch, LLP

(57) ABSTRACT

A UE receives downlink control information from an eNB through a PDCCH (Physical Downlink Control Channel) including one or more CCEs (Control Channel Elements). The UE transmits ACK/NACK (ACKnowledgment/Negative ACK) information associated with the downlink control information to the eNB by using at least one of a first PUCCH resource, which corresponds to an index determined on the basis of first offset information and an index of (Continued)

Individual Cell IDs for eNB, RRHs
( Network-decision based Rx point selection )

a specific CCE in the PDCCH and is generated using first cell identification information, and a second PUCCH resource, which corresponds to an index determined on the basis of second offset information and the index of the specific CCE and is generated using second cell identification information.

4 Claims, 27 Drawing Sheets

Related U.S. Application Data filed on Oct. 26, 2011, provisional application No. 61/556,812, filed on Nov. 7, 2011.

(51) Int. Cl.
*H04L 1/18* (2006.01)
*H04L 5/00* (2006.01)
*H04L 1/00* (2006.01)

(52) U.S. Cl.
CPC .......... *H04L 5/0055* (2013.01); *H04L 1/0026* (2013.01); *H04L 1/0073* (2013.01)

(58) Field of Classification Search
USPC .......................................................... 370/329
See application file for complete search history.

(56) References Cited

U.S. PATENT DOCUMENTS

| 2012/0008585 A1 | 1/2012 | Kwon et al. |
| 2012/0106491 A1 | 5/2012 | Yang et al. |
| 2012/0320813 A1 | 12/2012 | Han et al. |

FOREIGN PATENT DOCUMENTS

| WO | WO 2010/123286 A2 | 10/2010 |
| WO | WO 2011/085195 A1 | 7/2011 |
| WO | WO 2011/096722 A2 | 8/2011 |

OTHER PUBLICATIONS

3GPP TSG RAN WG1 #6 ;R1-104582 ;Madrid, Spain, Aug. 23-28, 2010; Source: Samsung ;Title: PUCCH HARQ-ACK Resource Mapping for DL CA).*

* cited by examiner

METHOD AND USER EQUIPMENT FOR TRANSMITTING UPLINK SIGNAL, AND METHOD AND EVOLVED NODE B FOR RECEIVING UPLINK SIGNAL

CROSS REFERENCE TO RELATED APPLICATIONS

This application is the National Phase of PCT/KR2012/008374 filed on Oct. 15, 2012, which claims priority under 35 U.S.C. 119(e) to U.S. Provisional Application Nos. 61/547,015 filed on Oct. 13, 2011, 61/551,899 filed on Oct. 26, 2011 and 61/556,812 filed on Nov. 7, 2011, all of which are hereby expressly incorporated by reference into the present application.

TECHNICAL FIELD

The present invention relates to a wireless communication system. Specifically, the present invention relates to a method and apparatus for transmitting an uplink signal and a method and apparatus for receiving an uplink signal.

BACKGROUND ART

With appearance and spread of machine-to-machine (M2M) communication and a variety of devices such as smartphones and tablet PCs and technology demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have been developed. In addition, a communication environment has evolved into increasing density of nodes accessible by a user at the periphery of the nodes. A node refers to a fixed point capable of transmitting/receiving a radio signal to/from a user equipment through one or more antennas. A communication system including high-density nodes may provide a better communication service to the user through cooperation between the nodes.

Such a multi-node cooperative communication scheme in which a plurality of nodes performs communication with the UE using the same time-frequency resource has much better data throughput than a conventional communication scheme in which the nodes perform communication with the UE without any cooperation by operating as independent eNBs.

A multi-node system performs cooperative communication using a plurality of nodes, each node operating as an eNB, an access point, an antenna, an antenna group, a radio remote header (RRH), or a radio remote unit (RRU). Unlike a conventional centralized antenna system in which antennas converge upon an eNB, the nodes are typically separated from each other by a predetermined interval or more in the multi-node system. The nodes may be managed by one or more eNBs or eNB controllers for controlling the operation thereof or scheduling data transmission/reception therethrough. Each node is connected to the eNB or eNB controller for managing the node through a cable or a dedicated line.

Such a multi-node system may be regarded as a type of MIMO system in that distributed nodes are capable of communicating with a single or multiple UEs by simultaneously transmitting/receiving different streams. However, since the multi-node system transmits signals using nodes distributed at various locations, a transmission region which should be covered by each antenna decreases in comparison with antennas included in the conventional centralized antenna system. Accordingly, compared with a conventional system implementing MIMO technology in the centralized antenna system, a transmit power needed when each antenna transmits a signal may be reduced in the multi-node system. In addition, since the transmission distance between an antenna and a UE is shortened, path loss is reduced and high-speed data transmission is achieved. Therefore, transmission capacity and power efficiency of a cellular system can be enhanced and relatively uniform quality of communication performance can be satisfied irrespective of the locations of UEs in a cell. Furthermore, in the multi-node system, since an eNB(s) or eNB controller(s) connected to multiple nodes performs cooperative data transmission/reception, signal loss generated in a transmission process is reduced. In addition, when nodes distant from each other by a predetermined distance or more perform cooperative communication with the UE, correlation and interference between antennas are reduced. Hence, according to the multi-node cooperative communication scheme, a high signal to interference-plus-noise ratio (SINR) can be achieved.

Due to such advantages of the multi-node system, in the next-generation mobile communication system, the multi-node system has emerged as a new basis of cellular communication through combination with or by replacing conventional centralized antenna systems in order to reduce additional installation costs of an eNB and maintenance costs of a backhaul network and simultaneously to expand service coverage and enhance channel capacity and SINR.

DETAILED DESCRIPTION OF THE INVENTION

Technical Problems

Due to introduction of new radio communication technology, the number of user equipments (UEs) to which an eNB should provide a service in a prescribed resource region increases and the amount of data and control information that the BS should receive/transmit from/to the UEs increases. Since the amount of resources available to the BS for communication with the UE(s) is finite, a new method in which the BS efficiently receives/transmits uplink/downlink data and/or uplink/downlink control information using the finite radio resources is needed.

Particularly, since a UE may simultaneously or selectively transmit uplink signals to different points in a multi-point system, a method for cancelling or minimizing interference between the uplink signals transmitted to the different points is needed.

Accordingly, the present invention provides a method and apparatus for efficiently transmitting/receiving an uplink/downlink signal.

The technical objects that can be achieved through the present invention are not limited to what has been particularly described hereinabove and other technical objects not described herein will be more clearly understood by persons skilled in the art from the following detailed description.

Technical Solution

In an aspect of the present invention, provided herein is a method for transmitting an uplink signal by a user equipment in a wireless communication system, including receiving downlink control information through a physical downlink control channel (PDCCH) including one or more control channel elements (CCEs); transmitting acknowledgment (ACK)/negative ACK (NACK) information associated with the downlink control information, wherein the ACK/NACK information is transmitted using at least one of a first PUCCH resource generated using first cell identity (ID) information and a second PUCCH resource generated using second cell ID information, the first PUCCH resource corresponds to an index determined based on first offset information and an index of a specific CCE in the PDCCH, and the second PUCCH resource corresponds to an index determined based on second offset information and the index of the specific CCE in the PDCCH.

In another aspect of the present invention, provided herein is a user equipment for transmitting an uplink signal in a wireless communication system, including a radio frequency (RF) unit; and a processor configured to control the RF unit, wherein the processor controls the RF unit to receive downlink control information through a physical downlink control channel (PDCCH) including one or more control channel elements (CCEs) and to transmit acknowledgment (ACK/negative ACK (NACK) information associated with the downlink control information, and wherein the processor controls the RF unit to transmit the ACK/NACK information using at least one of a first PUCCH resource generated using first cell identity (ID) information and a second PUCCH resource generated using second cell ID information, the first PUCCH resource corresponds to an index determined based on first offset information and an index of a specific CCE in the PDCCH, and the second PUCCH resource corresponds to an index determined based on second offset information and the index of the specific CCE in the PDCCH.

In another aspect of the present invention, provided herein is a method for receiving an uplink signal by a base station in a wireless communication system, including transmitting downlink control information through a physical downlink control channel (PDCCH) including one or more control channel elements (CCEs) to a user equipment; receiving acknowledgment (ACK)/negative ACK (NACK) information associated with the downlink control information from the user equipment, wherein the ACK/NACK information is received using at least one of the first PUCCH resource generated using first cell identity (ID) information and a second PUCCH resource generated using second cell ID information, the first PUCCH resource corresponds to an index determined based on first offset information and an index of a specific CCE in the PDCCH, and the second PUCCH resource corresponds to an index determined based on second offset information and the index of the specific CCE in the PDCCH.

In another aspect of the present invention, provided herein is a base station for receiving an uplink signal in a wireless communication system, including a radio frequency (RF) unit; and a processor configured to control the RF unit, wherein the processor controls the RF unit to transmit downlink control information through a physical downlink control channel (PDCCH) including one or more control channel elements (CCEs) to a user equipment and to receive acknowledgment (ACK)/negative ACK (NACK) information associated with the downlink control information from the user equipment, and wherein the processor controls the RF unit to receive the ACK/NACK information using at least one of the first PUCCH resource generated using first cell identity (ID) information and a second PUCCH resource generated using second cell ID information, the first PUCCH resource corresponds to an index determined based on first offset information and an index of a specific CCE in the PDCCH, and the second PUCCH resource corresponds to an index determined based on second offset information and the index of the specific CCE in the PDCCH.

In each aspect of the present invention, the first offset information, the first cell ID information, the second offset information, and the second cell ID information may be provided from the base station to the user equipment.

In each aspect of the present invention, the downlink control information may be transmitted to the user equipment from a first cell, and the ACK/NACK information may be transmitted using the first PUCCH resource in case of transmission to the base station in the first cell and may be transmitted using the second PUCCH resource in case of transmission to the base station in a second cell other than the first cell.

The above technical solutions are merely some parts of the embodiments of the present invention and various embodiments into which the technical features of the present invention are incorporated can be derived and understood by persons skilled in the art from the following detailed description of the present invention.

Advantageous Effects

According to the present invention, radio resources for uplink transmission towards different points can be prevented from colliding.

In addition, according to the present invention, interference between uplink signals on the same radio resource can be cancelled or minimized even when the same radio resource is used for uplink transmission towards different points.

According to the present invention, efficiency of use of uplink/downlink resources can be enhanced.

Effects according to the present invention are not limited to what has been particularly described hereinabove and other advantages not described herein will be more clearly understood by persons skilled in the art from the following detailed description of the present invention.

DESCRIPTION OF DRAWINGS

The accompanying drawings, which are included to provide a further understanding of the invention, illustrate embodiments of the invention and together with the description serve to explain the principle of the invention.

MODE FOR CARRYING OUT THE INVENTION

Figure 1:
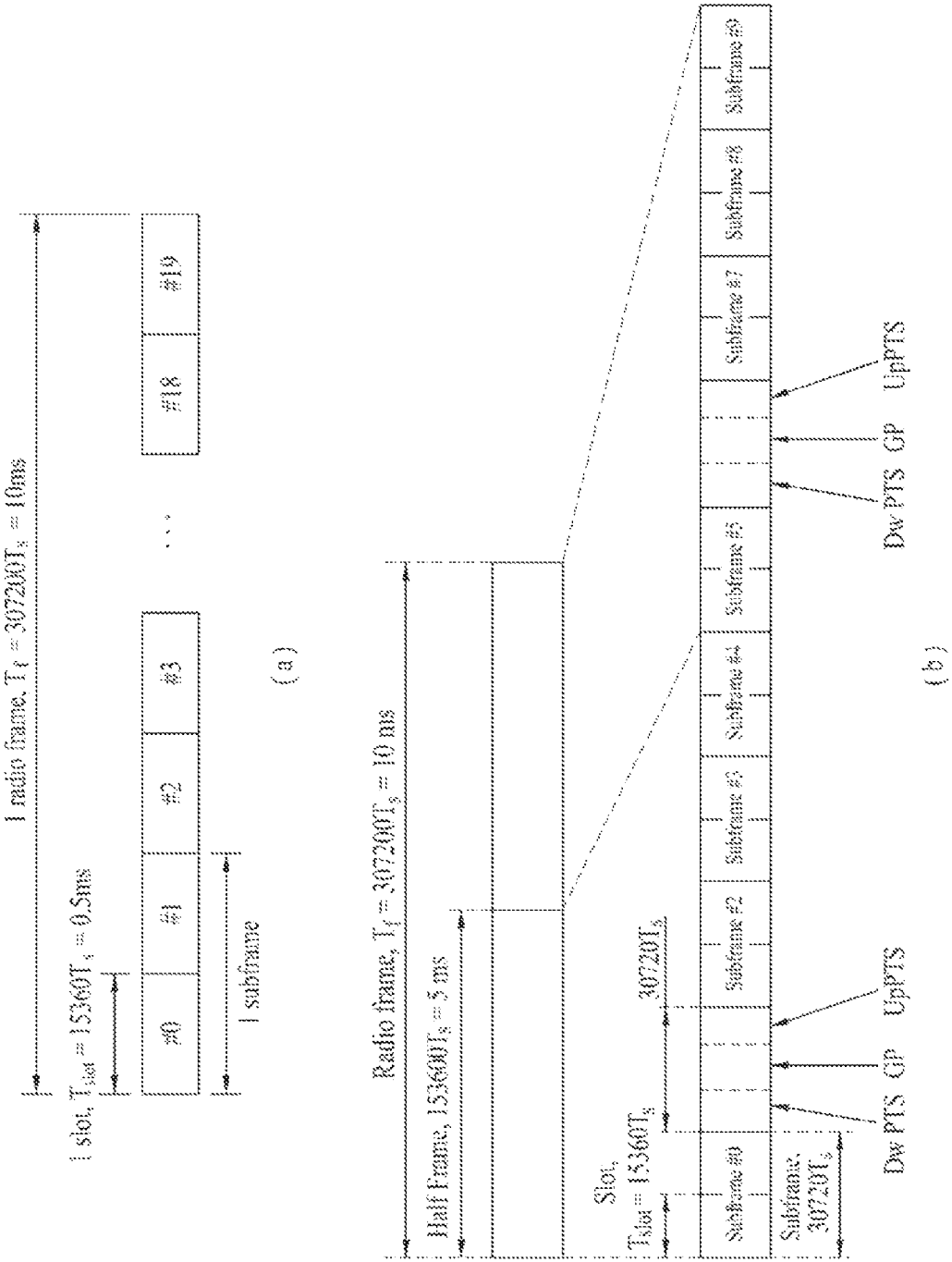
FIG. 1 illustrates the structure of a radio frame used in a wireless communication system.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a base station (BS) generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. Hereinafter, a BS is referred to as an eNB.

In the present invention, a point refers to a fixed node capable of transmitting/receiving a radio signal through communication with a UE. Various types of BSs may be used as points irrespective of the terms thereof. For example, a BS, a node B (NB), an e-node B (eNB), a pico-cell eNB (PeNB), a home eNB (HeNB), a relay, a repeater, etc. may be a point. In addition, a point may not be an eNB. For example, a radio remote head (RRH) or a radio remote unit (RRU) may be a point. The RRH or RRU generally has a lower power level than a power level of an eNB. Since the RRH or RRU (hereinafter, an RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per point. The antenna may mean a physical antenna or mean an antenna port, a virtual antenna, or an antenna group. A point may be referred to as a node. Unlike a conventional centralized antenna system (CAS) (i.e. a single-node system) including antennas which converge upon an eNB and are controlled by one eNB controller, a multi-point system includes a plurality of points separated from one another by a predetermined distance or more. The plural points may be managed by one or more eNBs or eNB controllers for controlling operation thereof or scheduling data transmission/reception therethrough. Each point may be connected to an eNB or eNB controller for managing the node through a cable or a dedicated line. In the multi-point system, the same cell identity (ID) or different cell IDs may be used to transmit/receive signals to/from a plurality of points. If the plural points have the same cell ID, each of the points operates as a partial antenna group of one cell. If the points have different cell IDs in the multi-point system, the multi-point system may be regarded as a multi-cell (e.g. a macro-cell/femto-cell/pico-cell) system. If multiple cells formed respectively by multiple points are configured in an overlaid form according to coverage, a network formed by the multiple cells is referred to as a multi-tier network. A cell ID of an RRH/RRU may be the same as or different from a cell ID of an eNB. When the RRH/RRU and the eNB use different cell IDs, both the RRH/RRU and the eNB operate as independent eNBs.

In the multi-point system of the present invention, which will be described below, one or more eNBs or eNB controllers, connected to a plurality of points, may control the plural points to simultaneously transmit or receive signals to or from a UE through some or all of the plural points. Although there is a difference between multi-point systems according to the nature of each point and implementation form of each point, the multi-point systems are different from single-point systems (e.g. a CAS, a conventional MIMO system, a conventional relay system, a conventional repeater system, etc.), in that plural points participate in providing a communication service to a UE on a predetermined time-frequency resource. Accordingly, embodiments of the present invention regarding a method for performing cooperative data transmission using some or all of plural points may be applied to various types of multi-point systems. For example, while a point generally refers to an antenna group separated by a predetermined interval or more from another point, the embodiments of the present invention, which will be described later, may be applied even when a point means an arbitrary antenna group irrespective of how far the point is separated from another point. For example, when an eNB includes a cross polarized (X-pole) antenna, the embodiments of the present invention are applicable under the assumption that the eNB controls a point including a horizontally polarized (H-pole) antenna and a point including a vertically polarized (V-pole) antenna.

A communication scheme capable of transmitting/receiving a signal through a plurality of transmission (Tx)/reception (Rx) points, transmitting/receiving a signal through at least one point selected from among a plurality of Tx/Rx points, or differentiating a point transmitting a downlink signal from a point receiving an uplink signal is referred to as multi-eNB MIMO or coordinated multi-point TX/Rx (CoMP). A coordinated transmission scheme of such coordinated communication between points may be classified largely into joint processing (JP) and scheduling coordination (CB). The JP scheme may further be divided into joint transmission (JT) and dynamic point selection (DPS) and CB scheme may further be divided into coordinated scheduling (CS) and coordinated beamforming (CB). DPS may also be called dynamic cell selection (DCS). When JP is performed compared with other communication schemes among coordination communication schemes between points, a wider variety of communication situations may be formed. JT of the JP scheme is a communication scheme for transmitting the same stream to a UE from a plurality of points. The UE restores the stream by combining signals received from the plural points. JT can improve reliability of signal transmission using transmit diversity because the same stream is transmitted by plural points. DPS of the JP scheme is a communication scheme for transmitting/receiving a signal through one point selected according to a specific rule from among a plurality of points. In DPS, since a point having a good channel state with a UE will typically be selected as a communication point, reliability of signal transmission can be improved.

Meanwhile, in the present invention, a cell refers to a prescribed geographical area to which one or more points provide a communication service. Accordingly, in the present invention, communicating with a specific cell may mean communicating with an eNB or a point which provides a communication service to the specific cell. In addition, a downlink/uplink signal of a specific cell refers to a downlink/uplink signal from/to an eNB or a point which provides a communication service to the specific cell. Hereinbelow, an eNB or a point for scheduling a UE connected thereto to transmit/receive an uplink/downlink signal will be referred to as a serving eNB or a serving point. A serving cell may correspond to coverage in which the serving eNB or serving point can provide a communication service.

Channel status/quality of a specific cell refers to channel status/quality of a channel or communication link formed between an eNB or point which provides a communication service to the specific cell and a UE. In a 3GPP LTE-A based system, the UE may measure a downlink channel state from a specific point using a channel state information-reference signal(s) (CSI-RS(s)) transmitted on a CSI-RS resource allocated to the specific point by an antenna port(s) of the specific point. Generally, neighboring points transmit corresponding CSI-RSs on orthogonal CSI-RS resources. When CSI-RS resources are orthogonal, this mean that at least one of CSI-RS resource configuration which specify symbols and subcarriers carrying the CSI-RSs, subframe configuration which specify subframes, to which CSI-RSs are allocated, by using subframe offset, transmission period and etc., and/or CSI-RS sequence is different from each other.

In the present invention, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (NACK), and a set of time-frequency resources or REs carrying downlink data, respectively. In addition, a physical uplink control channel (PUCCH) and a physical uplink shared channel (PUSCH) refer to a set of time-frequency resources or REs carrying uplink control information (UCI) and a set of time-frequency resources or REs uplink data, respectively. In the present invention, in particular, a time-frequency resource or RE that is assigned to or belongs to PDCCH/PCFICH/PHICH/PDSCH/PUCCH/PUSCH/PRACH is referred to as PDCCH/PCFICH/PHICH/PDSCH/PUCCH/PUSCH/PRACH RE or PDCCH/PCFICH/PHICH/PDSCH/PUCCH/PUSCH/PRACH time-frequency resource, respectively. Therefore, in the present invention, PUCCH/PUSCH transmission of a UE is conceptually identical to UCI/uplink data/random access signal transmission on PUSCH/PUCCH, respectively. In addition, PDCCH/PCFICH/PHICH/PDSCH transmission of an eNB is conceptually identical to downlink data/DCI transmission on PDCCH/PCFICH/PHICH/PDSCH, respectively.

FIG. 1 illustrates the structure of a radio frame used in a wireless communication system. Specifically, FIG. 1(a) illustrates an exemplary structure of a radio frame which can be used in frequency division multiplexing (FDD) in 3GPP LTE/LTE-A and FIG. 1(b) illustrates an exemplary structure of a radio frame which can be used in time division multiplexing (TDD) in 3GPP LTE/LTE-A.

Referring to FIG. 1, a 3GPP LTE(-A) radio frame is 10 ms (307,200 $T_s$) in duration. The radio frame is divided into 10 subframes of equal size. Subframe numbers may be assigned to the 10 subframes within one radio frame, respectively. Here, $T_s$ denotes sampling time where $T_s=1/(2048*15 \text{ kHz})$. Each subframe is 1 ms long and further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like.

A radio frame may have different configurations according to duplex modes. In FDD mode for example, since downlink (DL) transmission and uplink (UL) transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

Table 1 shows an exemplary UL-DL configuration within a radio frame in TDD mode.

TABLE 1

| DL-UL configuration | Downlink-to-Uplink switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |

TABLE 1-continued

| DL-UL config-uration | Downlink-to-Uplink switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 5 | 10 ms | D | S | U | D | D | D | D | D | D | D |
| 6 | 5 ms  | D | S | U | U | U | D | S | U | U | D |

In Table 1, D denotes a DL subframe, U denotes a UL subframe, and S denotes a special subframe. The special subframe includes three fields, i.e. downlink pilot time slot (DwPTS), guard period (GP), and uplink pilot time slow (UpPTS). DwPTS is a time slot reserved for DL transmission and UpPTS is a time slot reserved for UL transmission. Table 2 shows an example of the special subframe configuration.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

Figure 2:
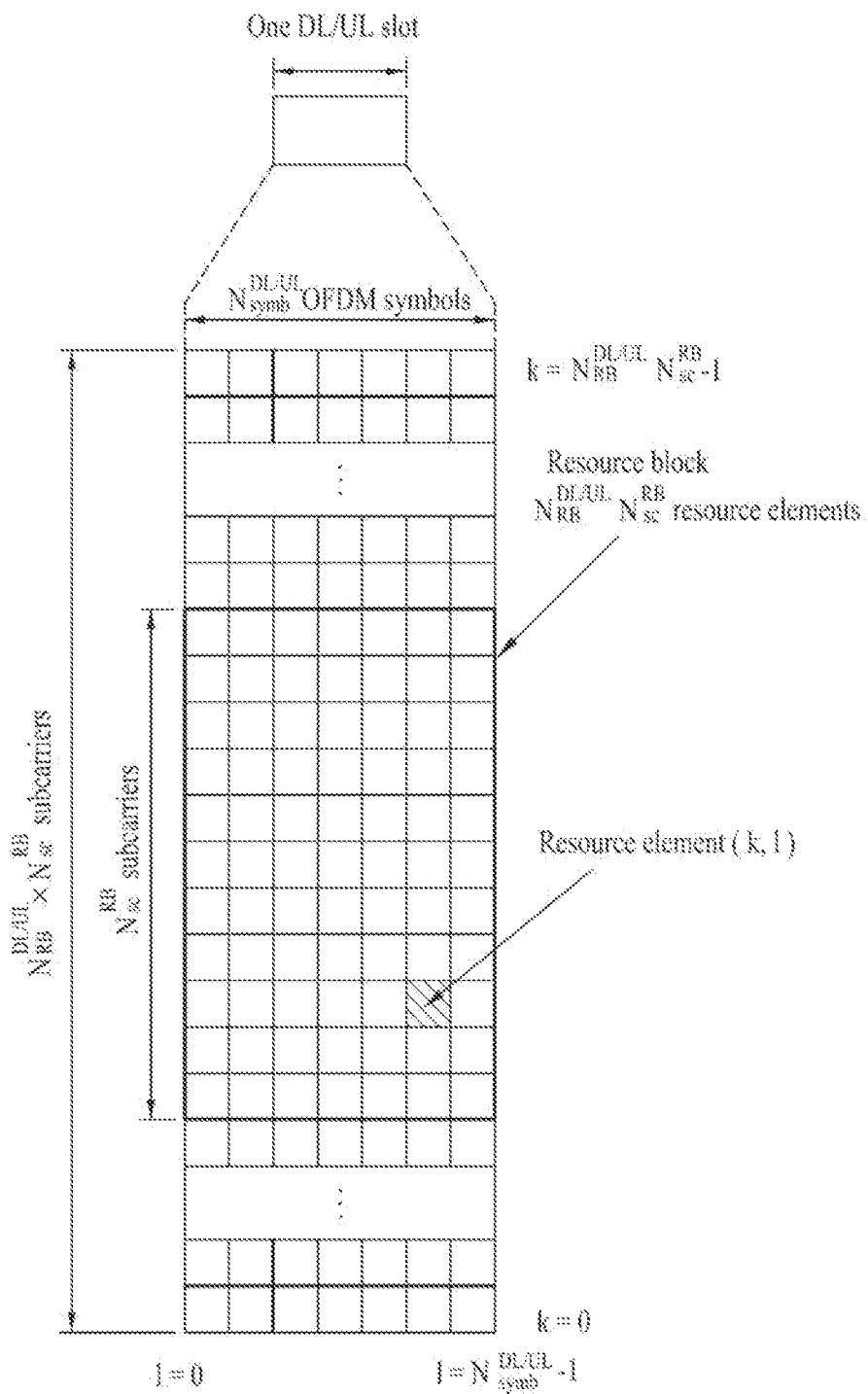
FIG. 2 illustrates the structure of a downlink (DL)/uplink (UL) slot in a wireless communication system.

FIG. 2 illustrates the structure of a DL/UL slot structure in a wireless communication system. In particular, FIG. 2 illustrates the structure of a resource grid of a 3GPP LTE(-A) system. One resource grid is defined per antenna port.

A slot includes a plurality of orthogonal frequency division multiplexing (OFDM) symbols in the time domain and includes a plurality of resource blocks (RBs) in the frequency domain. The OFDM symbol may refer to one symbol duration. Referring to FIG. 2, a signal transmitted in each slot may be expressed by a resource grid including $N^{DL/UL}_{RB} * N^{RB}_{sc}$ subcarriers and $N^{DL/UL}_{symb}$ OFDM symbols. $N^{DL}_{RB}$ denotes the number of resource blocks (RBs) in a DL slot and $N^{UL}_{RB}$ denotes the number of RBs in a UL slot. $N^{DL}_{RB}$ and $N^{UL}_{RB}$ depend on a DL transmission bandwidth and a UL transmission bandwidth, respectively. $N^{DL}_{symb}$ denotes the number of OFDM symbols in a DL slot, $N^{UL}_{symb}$ denotes the number of OFDM symbols in a UL slot, and $N^{RB}_{sc}$ denotes the number of subcarriers configuring one RB.

An OFDM symbol may be referred to as an OFDM symbol, an SC-FDM symbol, etc. according to multiple access schemes. The number of OFDM symbols included in one slot may be varied according to channel bandwidths and CP lengths. For example, in a normal cyclic prefix (CP) case, one slot includes 7 OFDM symbols. In an extended CP case, one slot includes 6 OFDM symbols. Although one slot of a subframe including 7 OFDM symbols is shown in FIG. 2 for convenience of description, embodiments of the present invention are similarly applicable to subframes having a different number of OFDM symbols. Referring to FIG. 2, each OFDM symbol includes $N^{DL/UL}_{RB} * N^{RB}_{sc}$ subcarriers in the frequency domain. The type of the subcarrier may be divided into a data subcarrier for data transmission, a reference signal (RS) subcarrier for RS transmission, and a null subcarrier for a guard band and a DC component. The null subcarrier for the DC component is unused and is mapped to a carrier frequency $f_0$ in a process of generating an OFDM signal or in a frequency up-conversion process. The carrier frequency is also called a center frequency.

One RB is defined as $N^{DL/UL}_{symb}$ (e.g. 7) consecutive OFDM symbols in the time domain and as $N^{RB}_{sc}$ (e.g. 12) consecutive subcarriers in the frequency domain. For reference, a resource composed of one OFDM symbol and one subcarrier is referred to a resource element (RE) or tone. Accordingly, one RB includes $N^{DL/UL}_{symb} * N^{RB}_{sc}$ REs. Each RE within a resource grid may be uniquely defined by an index pair (k, l) within one slot. k is an index ranging from 0 to $N^{DL/UL}_{RB} * N^{RB}_{sc} - 1$ in the frequency domain, and l is an index ranging from 0 to $N^{DL/UL}_{symb} - 1$ in the time domain.

In one subframe, two RSs each located in two slots of the subframe while occupying the same $N^{RB}_{sc}$ consecutive subcarriers are referred to as a physical resource block (PRB) pair. Two RBs configuring a PRB pair have the same PRB number (or the same PRB index).

Figure 3:
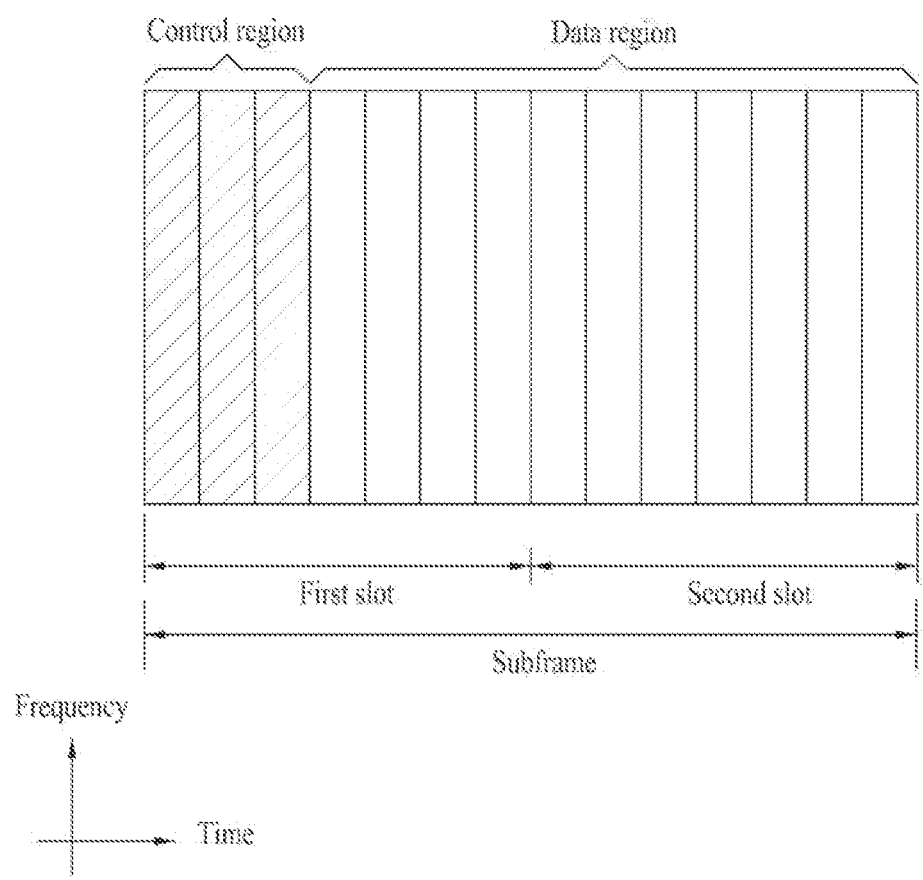
FIG. 3 illustrates the structure of a DL subframe used in a 3GPP (3$^{rd}$ Generation Partnership Project) LTE (Long Term Evolution)/LTE-A (Advanced) system.

FIG. 3 illustrates the structure of a DL subframe used in a 3GPP LTE(-A) system.

A DL subframe is divided into a control region and a data region in a time domain. Referring to FIG. 3, a maximum of 3 (or 4) OFDM symbols located in a front part of a first slot of a subframe correspond to the control region. Hereinafter, a resource region for PDCCH transmission in a DL subframe is referred to as a PDCCH region. OFDM symbols other than the OFDM symbol(s) used in the control region correspond to the data region to which a physical downlink shared channel (PDSCH) is allocated. Hereinafter, a resource region available for PDSCH transmission in the DL subframe is referred to as a PDSCH region. Examples of a DL control channel used in 3GPP LTE include a physical control format indicator channel (PCFICH), a physical downlink control channel (PDCCH), a physical hybrid ARQ indicator channel (PHICH), etc. The PCFICH is transmitted in the first OFDM symbol of a subframe and carries information about the number of OFDM symbols available for transmission of a control channel within a subframe. The PHICH carries a HARQ (Hybrid Automatic Repeat Request) ACK/NACK (acknowledgment/negative-acknowledgment) signal as a response to UL transmission.

The control information transmitted through the PDCCH will be referred to as downlink control information (DCI). The DCI includes resource allocation information for a UE or UE group and other control information. For example, the DCI includes transport format and resource allocation information of a downlink shared channel (DL-SCH), transport format and resource allocation information of an uplink shared channel (UL-SCH), paging information on a paging channel (PCH), system information on the DL-SCH, resource allocation information of upper layer control message such as random access response transmitted on the PDSCH, a set of Tx power control commands of individual UEs within a UE group, Tx power control information, and activity information of voice over Internet protocol (VoIP). The size and usage of the DCI carried by one PDCCH are varied depending on DCI formats. The size of the DCI may be varied depending on a coding rate. In the current 3GPP LTE system, various formats are defined, wherein format 0 is defined for a UL, and formats 1, 1A, 1B, 1C, 1D, 2, 2A, 3, and 3A are defined for a DL. Combination selected from control information such as a hopping flag, RB allocation, modulation coding scheme (MCS), redundancy version (RV), new data indicator (NDI), transmit power control (TPC), cyclic shift, cyclic shift demodulation reference signal (DM RS), UL index, channel quality information (CQI) request, DL assignment index, HARQ process number, transmitted precoding matrix indicator (TPMI), precoding matrix indicator (PMI) information is transmitted to the UE as the DCI.

Generally, a DCI format capable of being transmitted to the UE differs according to transmission mode (TM) configured for the UE. In other words, for the UE configured as a specific TM, all DCI formats cannot be used and only predetermined DCI format(s) corresponding to the specific TM can be used.

A PDCCH is transmitted on one control channel element (CCE) or an aggregate of a plurality of consecutive CCEs. The CCE is logical allocation unit used to provide a coding rate to a PDCCH based on a radio channel state. The CCE corresponds to a plurality of resource element groups (REGs). For example, one CCE corresponds to 9 REGs and one REG corresponds to 4 REs.

The eNB may transmit data to a UE or UE group in the data region. Data transmitted in the data region is referred to as user data. A PDSCH may be allocated to the data region for user data transmission. The PCH and the DL-SCH are transmitted on the PDSCH. A UE may decode control information received on a PDCCH and thus read data received on the PDSCH. The size and usage of DCI transmitted on one PDCCH may vary according to DCI format and the size of the DCI may vary according to coding rate. Information indicating to which UE or UE group PDSCH data is transmitted and information indicating how the UE or UE group should receive and decode the PDSCH data are transmitted on the PDCCH. For example, it is assumed that a specific PDCCH is CRC-masked with a radio network temporary identity (RNTI) 'A' and information about data transmitted using a radio resource 'B' (e.g. frequency location) and using transport format information 'C' (e.g. transmission block size, modulation scheme, coding information, etc.) is transmitted in a specific DL subframe. Then, the UE monitors the PDCCH using RNTI information thereof. The UE having the RNTI 'A' receives the PDCCH and receives the PDSCH indicated by 'B' and 'C' through information of the received PDCCH.

Figure 4:
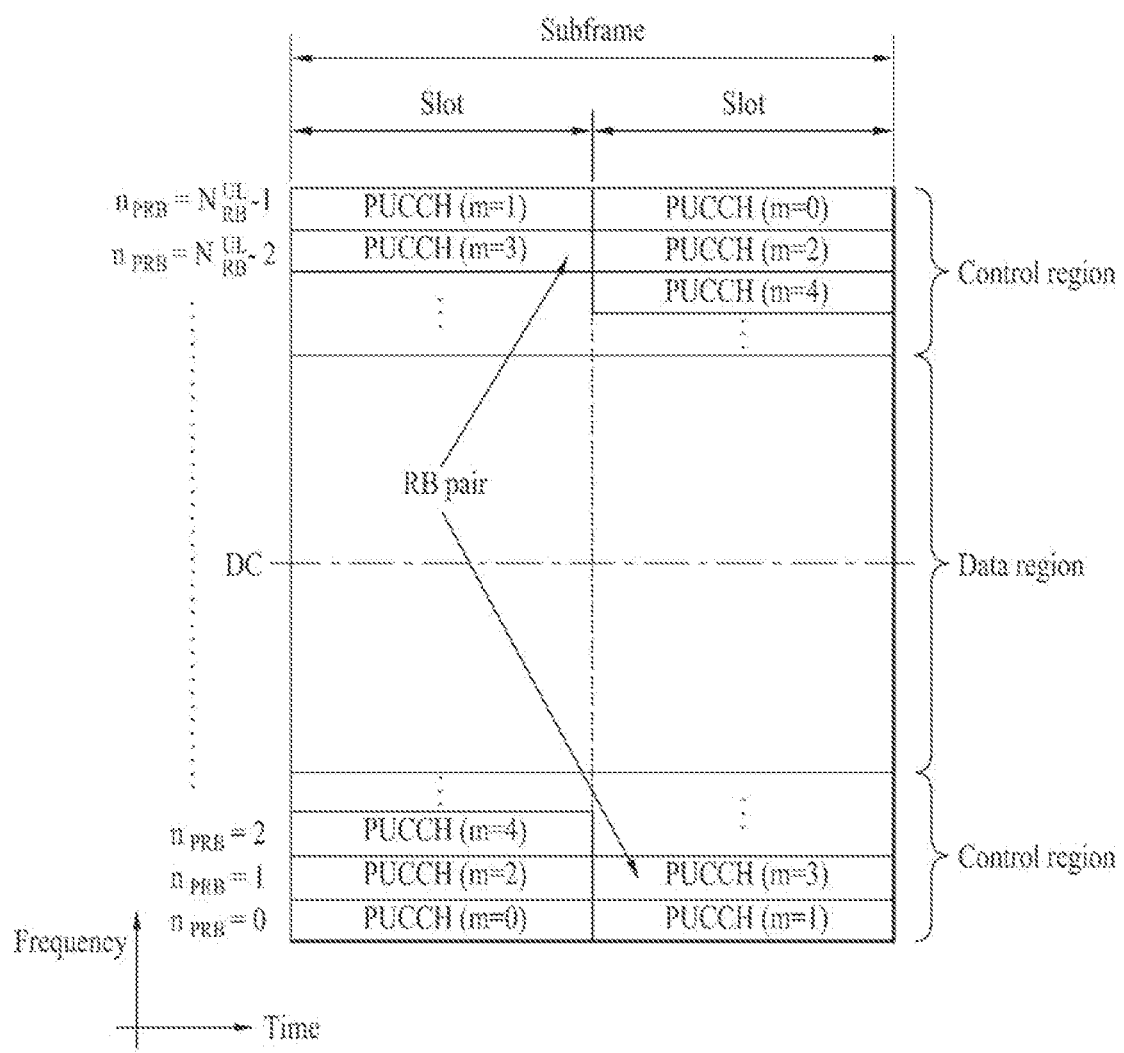
FIG. 4 illustrates the structure of a UL subframe used in a 3GPP LTE/LTE-A system.

FIG. 4 illustrates the structure of a UL subframe used in a 3GPP LTE(-A) system.

Referring to FIG. 4, a UL subframe may be divided into a data region and a control region in the frequency domain. One or several PUCCHs may be allocated to the control region to deliver UCI. One or several PUSCHs may be allocated to the data region of the UL subframe to deliver user data. A PUSCH may be transmitted together with a demodulation reference signal (DMRS) which is a reference signal (RS) for demodulating the user data transmitted through the PUSCH. The control region and data region in the UL subframe may be called a PUCCH region and a PUSCH region, respectively. A sounding reference signal (SRS) may be allocated to the data region. The SRS is transmitted on the last OFDM symbol of the UL subframe in the time domain and is transmitted on a data transmission band, that is, the data region, of the UL subframe in the frequency domain. SRSs of several UEs, which are transmitted/received on the last OFDM symbol of the same subframe, can be distinguished according to a frequency location/sequence.

If a UE uses a single carrier frequency division multiple access (SC-FDMA) scheme in UL transmission, a PUCCH and a PUSCH cannot be simultaneously transmitted on one carrier in a 3GPP LTE release-8 or release-9 system in order to maintain a single carrier property. In a 3GPP LTE release-10 system, support/non-support of simultaneous transmission of the PUCCH and the PUSCH may be indicated by higher layers.

In the UL subframe, subcarriers distant from a direct current (DC) subcarrier are used as the control region. In other words, subcarriers located at both ends of a UL transmission bandwidth are allocated to transmit UCI. A DC subcarrier is a component unused for signal transmission and is mapped to a carrier frequency $f_0$ in a frequency up-conversion process. A PUCCH for one UE is allocated to an RB pair belonging to resources operating on one carrier frequency and RBs belonging to the RB pair occupy different subcarriers in two slots. The PUCCH allocated in this way is expressed by frequency hopping of the RB pair allocated to the PUCCH over a slot boundary. If frequency hopping is not applied, the RB pair occupies the same subcarriers.

The PUCCH may be used to transmit the following control information.

Scheduling request (SR): SR is information used to request a UL-SCH resource and is transmitted using an on-off keying (OOK) scheme.

HARQ-ACK: HARQ-ACK is a response to a PDCCH and/or a response to a DL data packet (e.g. a codeword) on a PDSCH. HARQ-ACK indicates whether the PDCCH or PDSCH has been successfully received. 1-bit HARQ-ACK is transmitted in response to a single DL codeword and 2-bit HARQ-ACK is transmitted in response to two DL codewords. A HARQ-ACK response includes a positive ACK (simply, ACK), negative ACK (NACK), discontinuous transmission (DTX), or NACK/DRX. HARQ-ACK is used interchangeably with HARQ ACK/NACK and ACK/NACK.

Channel state information (CSI): CSI is feedback information for a DL channel. MIMO-related feedback information includes a rank indicator (RI) and a precoding matrix indicator (PMI).

The amount of UCI that can be transmitted by a UE in a subframe depends on the number of SC-FDMA symbols available for control information transmission. SC-FDMA symbols available for UCI correspond to SC-FDMA symbols other than SC-FDMA symbols used for reference signal transmission in a subframe. In the case of a subframe in which an SRS is configured, the last SC-FDMA symbol in the subframe is excluded from the SC-FDMA symbols available for UCI. A reference signal is used for coherent PUCCH detection. A PUCCH supports various formats according to transmitted information.

Table 3 shows a mapping relationship between PUCCH formats and UCI in an LTE/LTE-A system.

TABLE 3

| PUCCH format | Modulation scheme | Number of bits per subframe | Usage | Etc. |
|---|---|---|---|---|
| 1 | N/A | N/A (exist or absent) | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codewords |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 3, PUCCH format 1 series are mainly used to transmit ACK/NACK information, PUCCH format 2 series are mainly used to carry channel state information (CSI) such as channel quality indicator (CQI)/precoding matrix indicator (PMI)/rank indicator (RI), and PUCCH format 3 series are mainly used to transmit ACK/NACK information.

All PUCCH formats use a cell-specific cyclic shift, $n^{cell}_{cs}$ ($n_s$,l), which varies with the symbol number l and the slot number $n_s$ according to the following equation.

$$n_{cs}^{cell}(n_s,l)=\Sigma_{i=0}^{7}c(8N_{symb}^{UL} \cdot n_s+8l+i) \cdot 2^i \qquad \text{[Equation 1]}$$

The pseudo-random sequence c(i) may be defined by a length-31 Gold sequence. The output sequence c(n) of length $M_{PN}$, where n=0, 1, . . . , $M_{PN}$−1, is defined by the following equation.

$$c(n)=(x_1(n+N_C)+x_2(n+N_C)) \bmod 2 \qquad \text{[Equation 2]}$$

$$x_1(n+31)=(x_1(n+3)+x_1(n)) \bmod 2$$

$$x_2(n+31)=(x_2(n+3)+x_2(n+2)+x_2(n+1)+x_2(n)) \bmod 2$$

In Equation 2, $N_C$=1600 and the first m-sequence is initialized with $x_1(0)$=1, $x_1(n)$=0, n=1, 2, . . . , 30. The initialization of the second m-sequence is denoted by the following equation with a value depending on the application of the sequence.

$$c_{init}=\Sigma_{i=0}^{30} x_2(i) \cdot 2^i \qquad \text{[Equation 3]}$$

In Equation 1, a pseudo-random sequence generator which generates $n^{cell}_{cs}(n_s,l)$ is initialized with $c_{init}=N^{cell}_{ID}$ at the beginning of each radio frame. $N^{cell}_{ID}$ is a physical layer cell ID of a corresponding cell.

Physical resources used for PUCCHs depend on two parameters, $N^{(2)}_{RB}$ and $N^{(1)}_{CS}$, given by higher layers. The parameter $N^{(2)}_{RB}$, which is equal to or greater than 0 ($N^{(2)}_{RB} \geq 0$), indicates available bandwidth for PUCCH format 2/2a/2b transmission at each slot and is expressed as an integer multiple of $N^{RB}_{SC}$. The parameter $N^{(1)}_{CS}$ indicates the number of cyclic shifts used for PUCCH format 1/1a/1b in an RB used for a mixture of format 1/1a/1b and format 2/2a/2b. A value of $N^{(1)}_{CS}$ is an integer multiple of $\Delta^{PUCCH}_{shift}$ within a range of {0, 1, . . . , 7}. $\Delta^{PUCCH}_{shift}$ is provided by higher layers. If $N^{(1)}_{CS}$ is 0, no mixed RBs are present. At each slot, at most one RB supports a mixture of PUCCH format 1/1a/1b and PUCCH format 2/2a/2b. Resources used for transmission of PUCCH format 1/1a/1b, PUCCH format 2/2a/2b, and PUCCH format 3 by antenna port p are expressed by $n^{(1,p)}_{PUCCH}$, $n^{(2,p)}_{PUCCH} < N^{(2)}_{RB} \cdot N^{RB}_{sc}+\text{cell}(N^{(1)}_{cs}/8) \cdot (N^{RB}_{sc}-N^{(1)}_{cs}-2)$, and and $n^{(3,p)}_{PUCCH}$, respectively, which are indexes of non-negative integer indexes.

A UE is assigned a PUCCH resource for UCI transmission by an eNB through an explicit scheme using a higher-layer signal or through an implicit scheme using a dynamic control signal.

More specifically, an orthogonal sequence and/or a cyclic shift to be applied to UCI are determined from PUCCH resource indexes according to a specific rule predefined for each PUCCH format, and resource indexes of two RBs in a subframe, to which a PUCCH is to be mapped, are provided. For example, a PRB for PUCCH transmission in a slot $n_s$ is given as follows.

$$n_{PRB} = \begin{cases} \lfloor \frac{m}{2} \rfloor & \text{if } (m+n_s \bmod 2) \bmod 2 = 0 \\ N_{RB}^{UL}-1-\lfloor \frac{m}{2} \rfloor & \text{if } (m+n_s \bmod 2) \bmod 2 = 1 \end{cases} \qquad \text{[Equation 4]}$$

In Equation 4, a parameter m depends on a PUCCH format. PUCCH format 1/1a/1b, PUCCH format 2/2a/2b, and PUCCH format 3 are given by Equation 5, Equation 6, and Equation 7, respectively.

$$m = \begin{cases} N_{RB}^{(2)} & \text{if } n_{PUCCH}^{(1,p)} < c \cdot N_{cs}^{(1)}/\Delta_{shift}^{PUCCH} \\ \lfloor \frac{n_{PUCCH}^{(1,p)} - c \cdot N_{cs}^{(1)}/\Delta_{shift}^{PUCCH}}{c \cdot N_{sc}^{RB}/\Delta_{shift}^{PUCCH}} \rfloor + N_{RB}^{(2)} + \lceil \frac{N_{cs}^{(1)}}{8} \rceil & \text{otherwise} \end{cases} \qquad \text{[Equation 5]}$$

$$c = \begin{cases} 3 & \text{normal cyclic prefix} \\ 2 & \text{extended cyclic prefix} \end{cases}$$

In Equation 5, $n^{(1,p)}_{PUCCH}$ denotes a PUCCH resource index of an antenna port p for PUCCH format 1/1a/1b. In the case of an ACK/NACK PUCCH, $n^{(1,p)}_{PUCCH}$ is a value implicitly determined by the first CCE index of a PDCCH carrying scheduling information of a corresponding PDSCH.

$$m=\lfloor n_{PUCCH}^{(2,p)}/N_{sc}^{RB} \rfloor \qquad \text{[Equation 6]}$$

where $n^{(2,p)}_{PUCCH}$ denotes a PUCCH resource index of an antenna port p for PUCCH format 2/2a/2b and is a value transmitted to a UE from an eNB through higher-layer signaling.

$$m=\lfloor n_{PUCCH}^{(3,p)}/N_{SP,0}^{PUCCH} \rfloor \qquad \text{[Equation 7]}$$

$n^{(3,p)}_{PUCCH}$ denotes PUCCH resource index of an antenna port p for PUCCH format 3 and is value transmitted to a UE from an eNB through higher-layer signaling. $N^{PUCCH}_{SP,0}$ indicates a spreading factor for the first slot of a subframe.

For all of two slots of a subframe using normal PUCCH format 3, $N^{PUCCH}_{SP,0}$ is 5. For first and second slots of a subframe using a reduced PUCCH format 3, $N^{PUCCH}_{SP,0}$ is 5 and 4, respectively.

Figure 5:
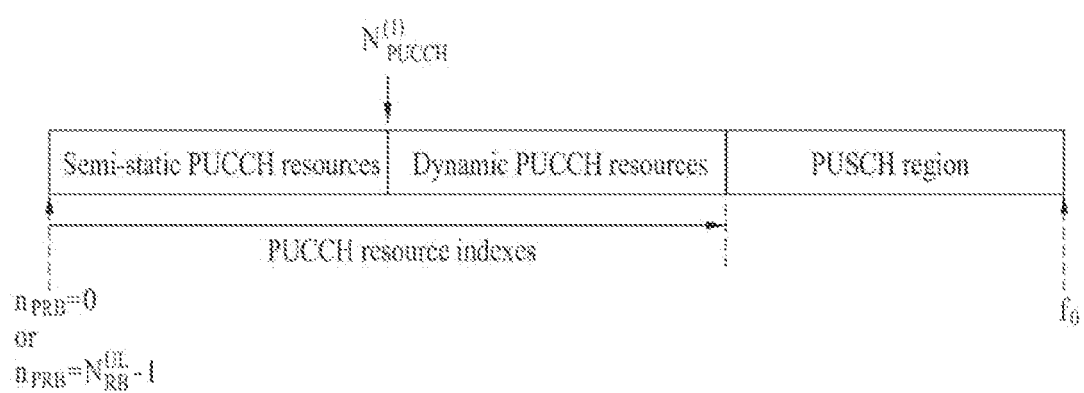
FIG. 5 illustrates logical arrangement of physical uplink control channel (PUCCH) resources used in one cell.

FIG. 5 illustrates logical arrangement of PUCCH resources used in one cell.

As described with reference to Equation 1 to Equation 3, since $n^{cell}_{cs}(n_{s,t})$ of PUCCH resources varies with $N^{cell}_{ID}$, it is said that the PUCCH resources of a cell are configured based on $N^{cell}_{ID}$. A UE acquires $N^{cell}_{ID}$ based on DL synchronization signals, i.e., a primary synchronization signal (PSS) and a secondary synchronization signal (SSS), of the cell and configures PUCCH resources for PUCCH transmission in the cell, that is, for PUCCH transmission to a point of the cell, based on the acquired $N^{cell}_{ID}$. The PUCCH resources configured based on $N^{cell}_{ID}$ include PUCCH resources for CSI transmission, PUCCH resources for semi-persistent scheduling (SPS) ACK/NACK and SR transmission, and PUCCH resources for dynamic ACK/NACK transmission (i.e. dynamically allocated PUCCH resources linked to a PDCCH). In a 3GPP LTE/LTE-A system, PUCCH resources for transmission of CSI, SPS ACK/NACK, SR, etc. are semi-statically reserved explicitly for the UE by a higher-layer signal. Herein after, for ACK/NACK transmission, a PUCCH resource dynamically determined in association with a PDCCH is especially referred to as a dynamic PUCCH resource or an implicit PUCCH resource, and a PUCCH resource explicitly configured by a higher-layer signal is referred to as a semi-static PUCCH resource or an explicit PUCCH resource.

Referring to FIG. 5, PUCCH resources based on $N^{cell}_{ID}$ are arranged in order of CSI PUCCH resources, SPS ACK/NACK and SR PUCCH resources, and dynamic ACK/NACK PUCCH resources in the direction of a DC subcarrier (i.e. a subcarrier mapped to $f_o$ in a frequency up-conversion procedure) from subcarriers distant from the DC subcarrier. In other words, semi-statically configured PUCCH resources through higher-layer signaling are located at an outer side of UL transmission bandwidth and dynamically configured ACK/NACK PUCCH resources are located nearer a center frequency than the semi-statically configured PUCCH resources. In this case, as a PUCCH resource approaches the center frequency, a PUCCH resource index increases. Namely, the index of a PUCCH resource allocated to a PRB near the center frequency is larger than the index of a PUCCH resource allocated to a PRB distant from the center frequency. A plurality of PUCCH resources in the same PRB is indexed based on an orthogonal sequence and/or a cyclic shift.

In each UE, an ACK/NACK signal is transmitted on different resources including different CSs (frequency domain codes) of a computer-generated constant amplitude zero autocorrelation (CG-CAZAC) sequence and OCs (time domain spread codes). An OC includes, for example, a Walsh/discrete Fourier transform (DFT) OC. An orthogonal sequence (e.g. $[w_0, w_1, w_2, w_3]$) may be applied in either an arbitrary time domain (after fast Fourier transform (FFT) modulation) or an arbitrary frequency domain (before FFT modulation). If the number of CSs is 6 and the number of OCs is 3, a total of 18 UEs may be multiplexed in the same physical resource block based on a single antenna port. In other words, PUCCH resources used for transmission of an ACK/NACK signal may be distinguished by an OCC, a CS (or a CAZAC CS (CCS)), and a PRB. If any one of the OCC, CS, and PRB of PUCCH resources differs, the PUCCH resources may be different resources.

Figure 6:
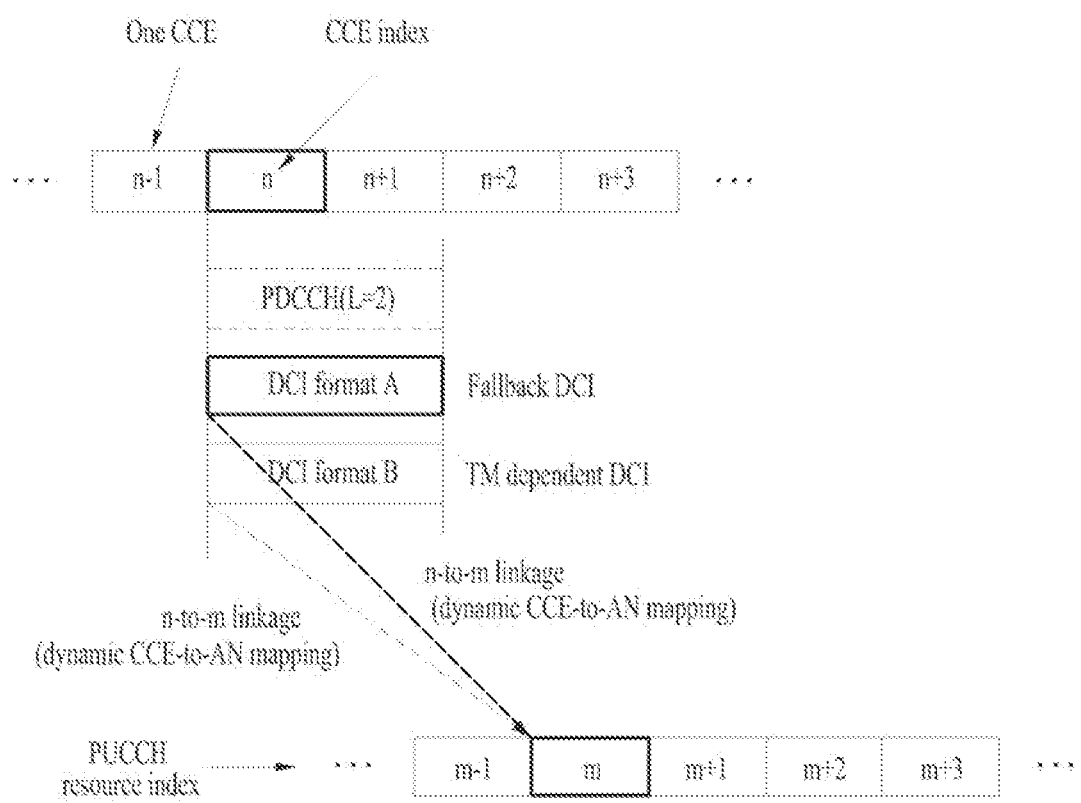
FIG. 6 illustrates an example of determining a dynamic PUCCH resource in a 3GPP LTE/LTE-A system.

FIG. 6 illustrates an example of determining a dynamic PUCCH resource in a 3GPP LTE/LTE-A system.

PUCCH resources for ACK/NACK are not pre-allocated to each UE and plurality of UEs in a cell dividedly uses a plurality of PUCCH resources at each time point. Specifically, PUCCH resources used by the UE to carry ACK/NACK are dynamically determined based on a PDCCH carrying scheduling information for a PDSCH carrying corresponding DL data. An entire region in which the PDCCH is transmitted in each DL subframe includes a plurality of CCEs and the PDCCH transmitted to the UE is composed of one or more CCEs. The UE transmits ACK/NACK through a PUCCH resource linked to a specific CCE (e.g. first CCE) among the CCEs constituting the PDCCH received thereby.

Referring to FIG. 6, each PUCCH resource index corresponds to a dynamic PUCCH resource for ACK/NACK. According to channel state, an eNB transmits DCI (or fallback DCI) according to TM configured for the UE to the UE on a PDCCH. The fallback DCI refers to DCI to be used for communication according to another TM having lower communication efficiency (hereinafter, fallback mode) than the corresponding TM, in preparation for the case in which it is difficult to perform communication according to TM due to a poor channel state. Hereinafter, DCI according to TM will be referred to as TM dependent DCI and DCI for a fallback mode will be referred to as fallback DCI. Upon detecting the fallback DCI, the UE may switch to the fallback mode and operate in the fallback mode. Alternatively, when RRC reconfiguration should be performed, the UE may switch to the fallback mode and operate in the fallback mode in order to eliminate ambiguity generated while RRC reconfiguration is performed.

Referring to FIG. 6, an eNB may transmit scheduling information for a PDSCH to a UE through a PDCCH of an aggregation level 2 (L=2) on CCEs n and n+1. The UE is configured as a specific TM through higher-layer signaling. Therefore, DCI format which can be transmitted to the UE is limited to a fallback DCI format (DCI format A in FIG. 6) and a TM dependent DCI format (DCI format B of FIG. 6) according to TM configured for the UE. The UE attempts to decode a PDCCH candidate(s) according to the aggregation level depending on DCI format A and DCI format B in a common search space and/or a UE-specific search space, demodulates a PDSCH using a detected DCI format, and transmits ACK/NACK for the PDSCH to the eNB using a PUCCH resource linked to a CCE of a PDCCH on which the DCI format is detected. In this case, since DCI format A and DCI format B are transmitted on the same CCE resources, they are linked to the same PUCCH resource m. Accordingly, the UE transmits ACK/NACK associated with corresponding DCI to the eNB using the PUCCH resource m in both cases in which DCI of DCI format A is detected and DCI of DCI format B is detected and the eNB receives ACK/NACK associated with the corresponding DCI from the UE using the PUCCH resource m in both cases in which the DCI of DCI format A is transmitted and the DCI of DCI format B is transmitted.

Specifically, in the 3GPP LTE/LTE-A system, PUCCH resource indexes for transmission by two antenna ports ($p_0$ and $p_1$) are determined as follows.

$$n_{PUCCH}^{(1,\tilde{p}=p0)} = n_{CCE} + N_{PUCCH}^{(1)} \qquad \text{[Equation 8]}$$

$$n_{PUCCH}^{(1,\tilde{p}=p1)} = n_{CCE} + 1 + N_{PUCCH}^{(1)} \qquad \text{[Equation 9]}$$

Here, $n^{(1,\tilde{p}=p0)}_{PUCCH}$ denotes a PUCCH resource index (i.e. number) to be used by the antenna port $p_0$, $n^{(1,p=p1)}{}_{PUCCH}$ denotes resource index to be used by the antenna port $p_1$, and $N^{(1)}{}_{PUCCH}$ denotes a value signaled from a higher layer. $N^{(1)}{}_{PUCCH}$ corresponds to a location at which a dynamic PUCCH resource is stated among PUCCH resources of a cell. $n_{CCE}$ corresponds to the smallest value among CCE indexes used for PDCCH transmission. For example, when a CCE aggregation level is 2 or more, the first CCE index among a plurality of CCE indexes aggregated for PDCCH transmission is used to determine an ACK/NACK PUCCH resource. That is, a PUCCH resource used to transmit ACK/NACK for a PDCCH or a PDSCH according to the PDCCH is determined in association with a DL CCE and this is called a dynamic CCE-to-AN linkage.

According to a 3GPP LTE/LTE-A system up to now, all UEs serviced in a specific cell semi-statically receive information indicating the same $N^{(1)}{}_{PUCCH}$ from an eNB of the cell. In other words, according to a legacy 3GPP LTE/LTE-A system, UEs located in a specific cell share dynamic PUCCH resources after $N^{(1)}{}_{PUCCH}$ and the dynamic PUCCH resources are linked to CCE indexes commonly applied to the specific cell, respectively. If a cell in which the UE receives a DL signal is the same as a cell in which the UE transmits a UL signal, the UE may determine the dynamic PUCCH resources without any problem using only a cell-specifically provided $N^{(1)}{}_{PUCCH}$.

However, in a CoMP system in which a cell in which a UE receives a DL signal (hereinafter, a DL cell) may be different from a cell in which the UE transmits a UL signal (hereinafter, a UL cell), if UEs receiving DL signals from the same DL cell share dynamic PUCCH resources, there are risks that different UEs use the same PUCCH resource and transmission performance is degraded due to interference between UL signals of different UEs transmitted on the same PUCCH resource. Hereinafter, problems which may be generated in a CoMP situation will be described in more detail with reference to FIG. 7.

Figure 7:
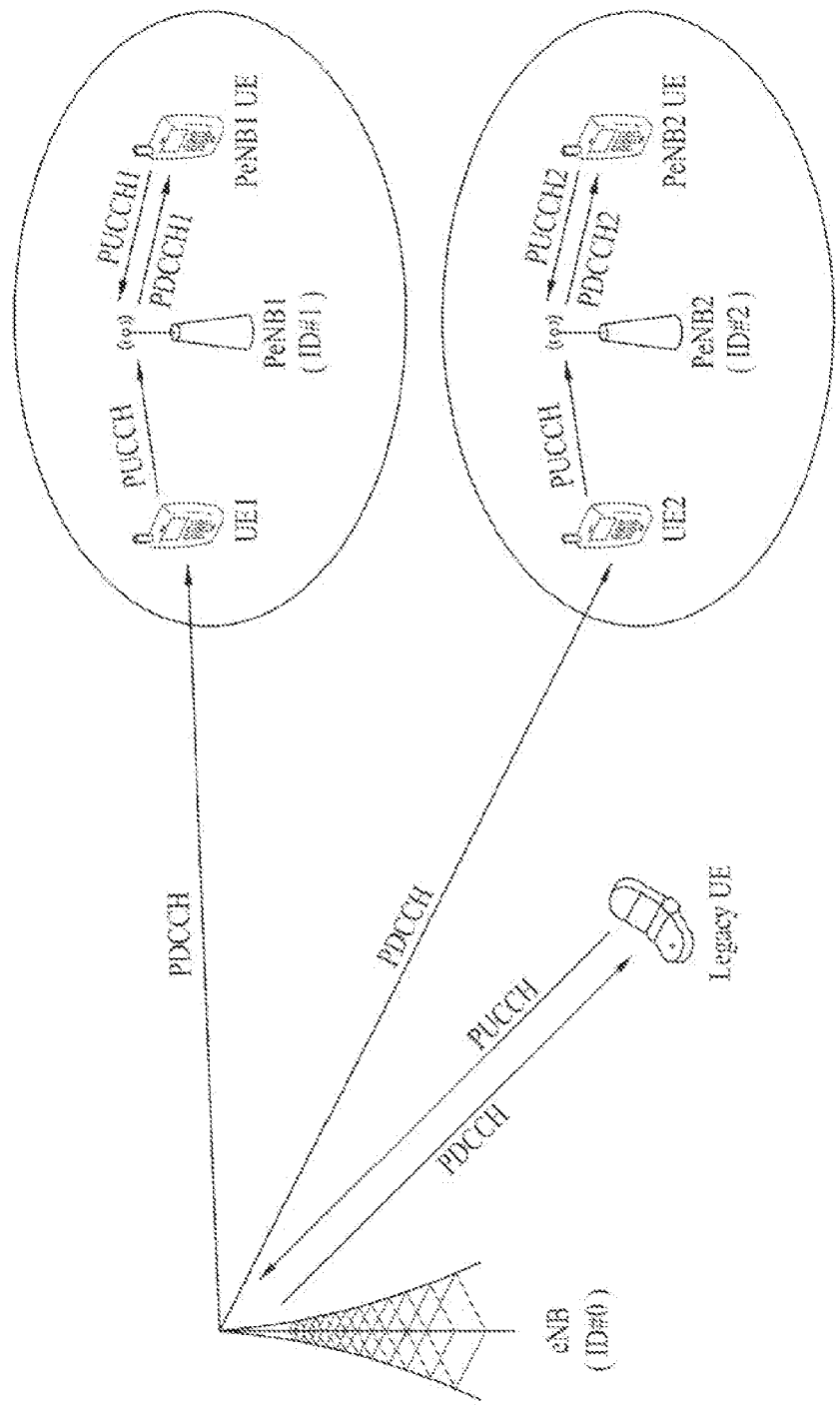
FIG. 7 illustrates PUCCH transmission in a coordinated multi-point transmission/reception (CoMP) situation.

FIG. 7 illustrates PUCCH transmission in a CoMP situation. Specifically, FIG. 7 illustrates an example in which UEs receiving PDCCHs from the same eNB transmit PUCCHs associated with the PDCCHs towards different eNBs.

In FIG. 7, a PeNB indicates an eNB of a pico cell. The PeNB is a type of micro eNB which is a small-scale version of a macro eNB. The micro eNB may independently operate while performing most of the functions of the macro eNB. The micro eNB has narrow coverage and lower transmit power than the macro eNB and accommodates fewer UEs than the macro eNB. A HeNB may be an overlay type of eNB installed in an area covered by the macro eNB or a non-overlay type of eNB installed in a shadow area that cannot be covered by the macro eNB. Generally, as compared with an eNB owned by a mobile communication network operator, the micro eNB has low radio transmission output. Accordingly, service coverage provided by the micro eNB is generally smaller than that provided by the eNB. For example, a pico eNB, a femto eNB, a relay, etc. may be a micro eNB. A geographic area to which a communication service is provided by the micro eNB may be referred to as a micro cell, a pico cell, a femto cell, etc according to a type of micro eNB. A network in which the macro eNB coexists with the micro eNB even when the same radio access technology (RAT) is used is referred to as a heterogeneous network and a network including only the macro eNBs or including only the micro eNB is referred to as a homogeneous network.

Hereinbelow, a UE having an eNB as a serving point will be referred to as an eNB UE and a UE having a PeNB as a serving point will be referred to as a PeNB UE. In addition, a UE configured to support or perform CoMP will be referred to as a CoMP UE, and a UE configured not to support or perform CoMP will be referred to as a legacy UE. If a UE is an eNB UE and simultaneously a CoMP UE, this UE is referred to as an eNB CoMP UE. Meanwhile, a PDCCH transmitted by an eNB is referred to as an eNB PDCCH and a PDCCH transmitted by a PeNB is referred to as a PeNB PDCCH.

Referring to FIG. 7, a PUCCH resource for a legacy UE, that is a UE not supporting CoMP, and PUCCH resources for eNB CoMP UE1 and eNB CoMP UE2, that are UEs supporting CoMP, are determined based on a CCE in an eNB PDCCH (hereinafter, eNB CCE). If eNB CoMP UE1 and eNB CoMP UE2 perform PUCCH transmissions at a low transmit power, interference of PUCCH transmission with neighboring cells or points can be reduced. Accordingly, PUCCH transmissions by eNB CoMP UE1 and eNB CoMP UE2 may be performed with respect to respective PeNBs rather than an eNB that has transmitted the eNB PDCCH. In this case, which PUCCH resources need to be used for PUCCH transmissions by eNB CoMP UE1 and eNB CoMP UE2 becomes problematic. According to a dynamic CCE-to-AN linkage, an eNB CoMP UE should transmit an ACK/NACK signal thereof to a PeNB, using a PUCCH resource linked to an eNB PDCCH. The PUCCH resource of the eNB CoMP UE is determined based on a CCE of the eNB PDCCH, whereas a PUCCH resource of a PeNB UE is determined based on a CCE of a PeNB PDCCH. Therefore, the PUCCH resource used by the eNB CoMP UE may collide with the PUCCH resource transmitted by the PeNB UE to the PeNB.

That is, when a Tx point (TP) transmitting a DL signal to a UE is different from an Rx point (RP) receiving a UL signal transmitted by the UE, an index of a PUCCH resource linked to a CCE of a PDCCH received in a DL cell may be used for another PUCCH resource in a UL cell and the PUCCH resource linked to the CCE of the PDCCH received in the DL cell may be linked to a CCE of another PDCCH in the UL cell. In addition, since semi-static PUCCH resources are independently reserved in each cell, a start position of dynamic PUCCH resources of the DL cell may differ from a start position of dynamic PUCCH resources of the UL cell and, in this case, a PUCCH resource linked to a specific CCE cannot be determined by only one $N^{(1)}{}_{PUCCH}$.

Figure 8:
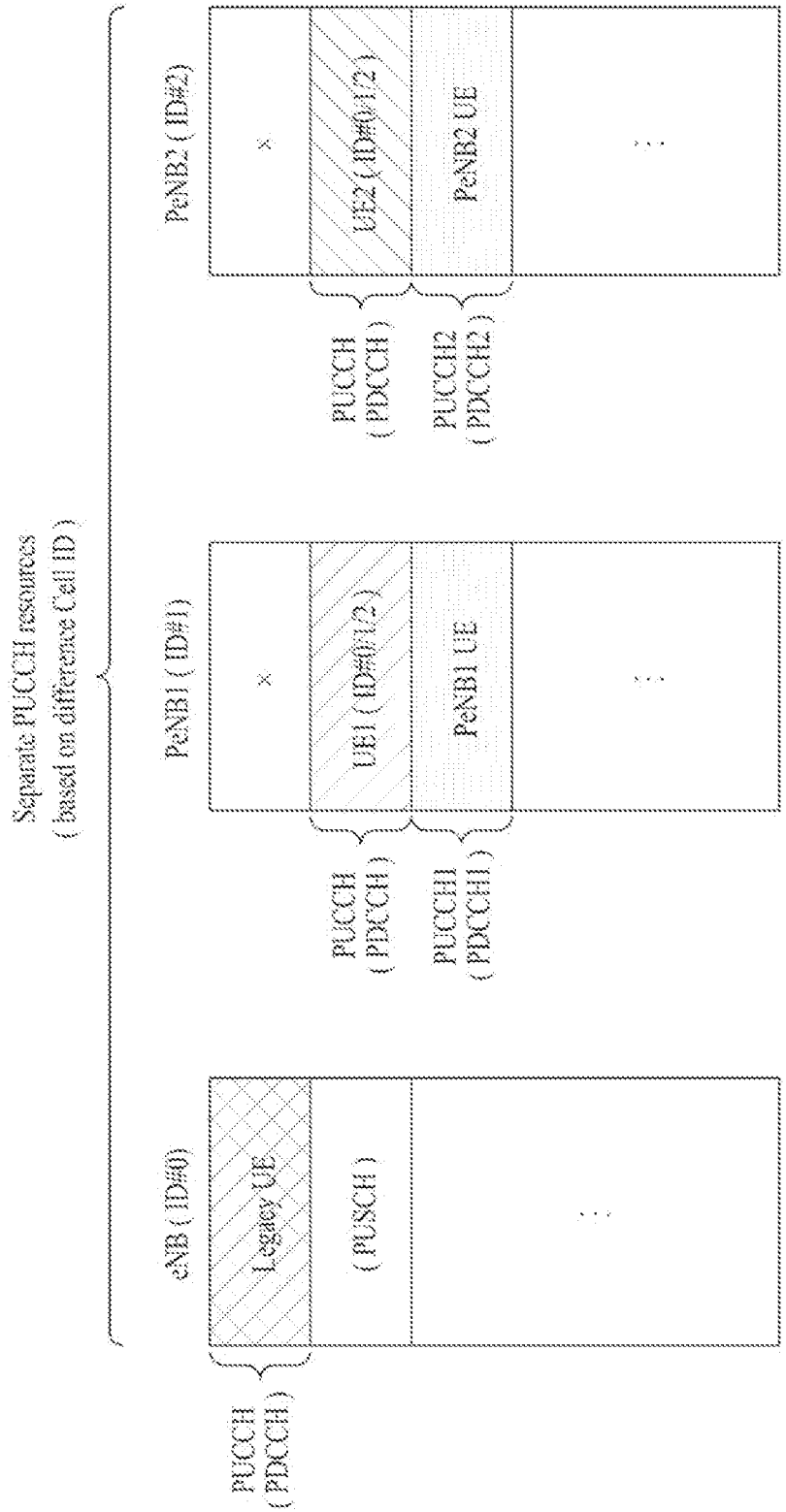
FIG. 8 illustrates exemplary PUCCH transmission of user equipments (UEs) of FIG. 7 according to the present invention.

FIG. 8 illustrates exemplary PUCCH transmission of UEs of FIG. 7 according to the present invention. In FIG. 8, "PUCCH (PDCCH)" denotes PDCCH CCE-to-PUCCH ACK/NACK linkage.

To solve the above-described problems, the present invention proposes that a PUCCH resource for PUCCH transmission to an eNB by an eNB UE having the eNB as a serving point and a PUCCH resource for PUCCH transmission to another point by the eNB UE be reserved in different PUCCH resource regions. That is, a separate PUCCH resource region different from a PUCCH resource region secured for a legacy UE of an eNB or a CoMP UE transmitting a PUCCH to the eNB is secured for PUCCH transmission to a PeNB. From the viewpoint of the PeNB, a PUCCH resource for a PUCCH transmitted to the PeNB by a PeNB UE having the PeNB as a serving point and a PUCCH resource for a PUCCH transmitted by an eNB CoMP UE towards the PeNB may be reserved in different PUCCH resource regions as illustrated in FIG. 8. The eNB CoMP UE1 and eNB CoMP UE2 of FIG. 7 may use eNB cell ID#0 (or ID#1 or ID#2) to configure (or generate) a PUCCH resource to be linked to a CCE of an eNB PDCCH.

The present invention may be applied to a CoMP UE under a CoMP situation in which a PeNB does not include a cell ID thereof as well as under a CoMP situation in which the PeNB has a different cell ID from an eNB. In terms of the fact that a PUCCH resource can be spatially reused, CoMP UEs, UE2, may use not only an eNB cell ID but also a PeNB cell ID (or a virtual cell ID) to generate a PUCCH resource, as illustrated in FIG. 8. In the present invention, the CoMP UEs are pre-informed of cell ID(s) for PUCCH transmission.

FIG. 8, a region indicated by "(PUSCH)" represents a region which can be used for PUSCH transmission scheduled by an eNB even though a PeNB is scheduled to use the same resource (e.g. the same PRB) for PUSCH transmission thereof. To reuse the "(PUSCH)" region, it is desirable that the eNB cautiously control PUSCH transmission, for example, with a low Tx power so that PUSCH transmission does not interfere with PUCCH transmission to the PeNB.

For reference, PUCCH resources of PUCCH format 2/3 semi-statically configured by an RRC signal may be shared by a CoMP UE and a PeNB UE because cells (or eNB and PeNB) cooperatively reserve PUCCH format 2/3 resources.

A legacy PUCCH resource linked to a PDCCH may be used for a legacy UE, a DL cell and a UL cell of which are the same, and a new PUCCH resource linked to the PDCCH may be used for a CoMP UE, a DL cell and a UL cell of which differ. To avoid collision between a PUCCH resource allocated by an eNB and a PUCCH resource allocated by a PeNB, a PUCCH resource for a CoMP UE scheduled by the eNB is separately reserved from a PUCCH resource for a PeNB UE scheduled by the PeNB.

As described above, points participating in CoMP may have different $N^{cell}_{ID}$ or have the same $N^{cell}_{ID}$. The present invention may be applied both to UL CoMP to points having different $N^{cell}_{ID}$ and to UL CoMP having the same $N^{cell}_{ID}$.

Hereinafter, the present invention for allocating a UL control resource will be described in more detail, in a UL CoMP situation in which a plurality of receiving devices simultaneously receive a signal transmitted by a UE (in the case of JR) or some of the receiving devices selectively receive the signal (in the case of UL DPS). Specifically, in a HetNet situation including an eNB and a plurality of RRHs, a detailed PUCCH resource allocation method will be separately described in the case in which an RRH having a cell ID participates in UL CoMP and the case in which an RRH which does not have a cell ID participates in UL CoMP.

<Different Cell IDs>

Figure 9:
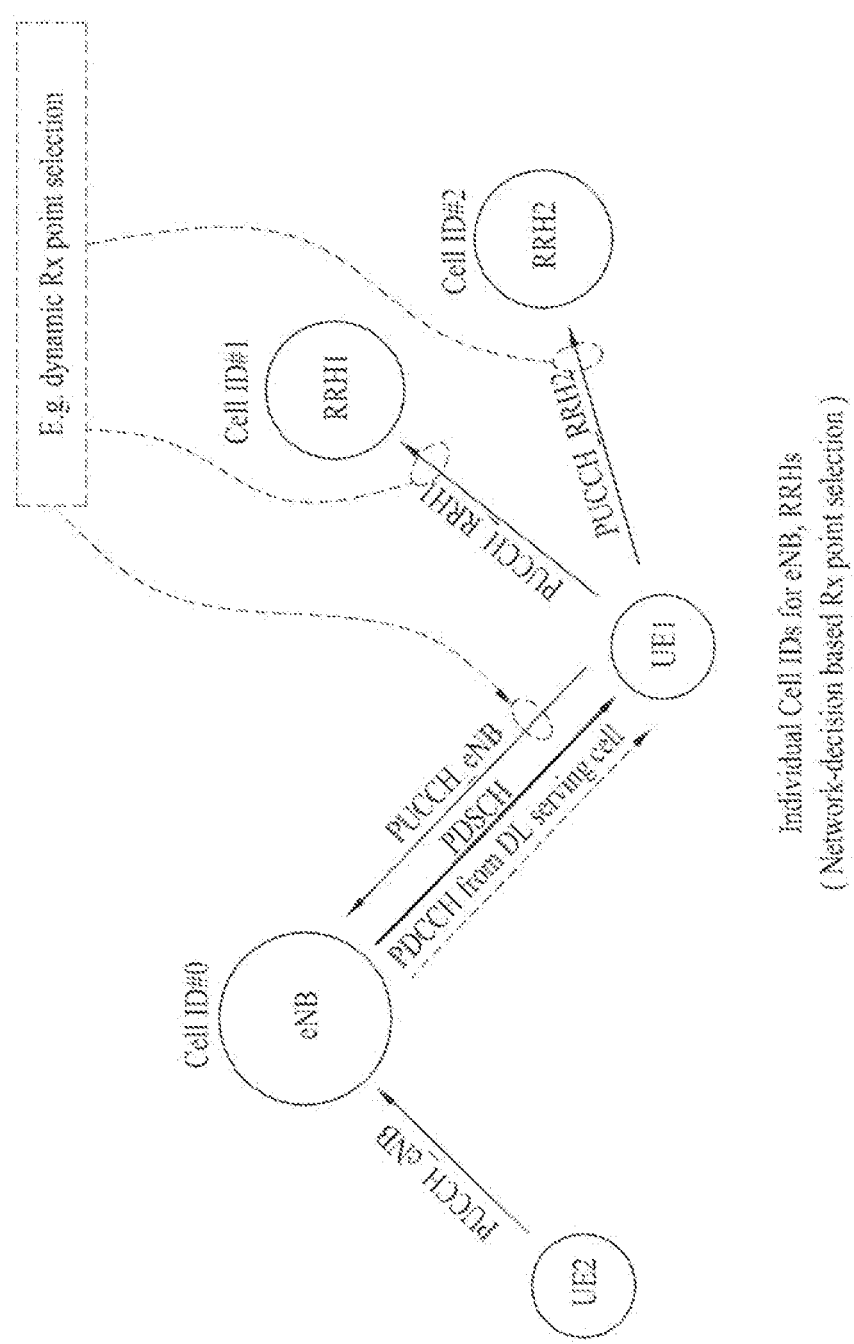
FIG. 9 illustrates an example in which an eNB and remote radio heads (RRHs) using different cell IDs participate in UL dynamic point selection (DPS).
Figure 10:
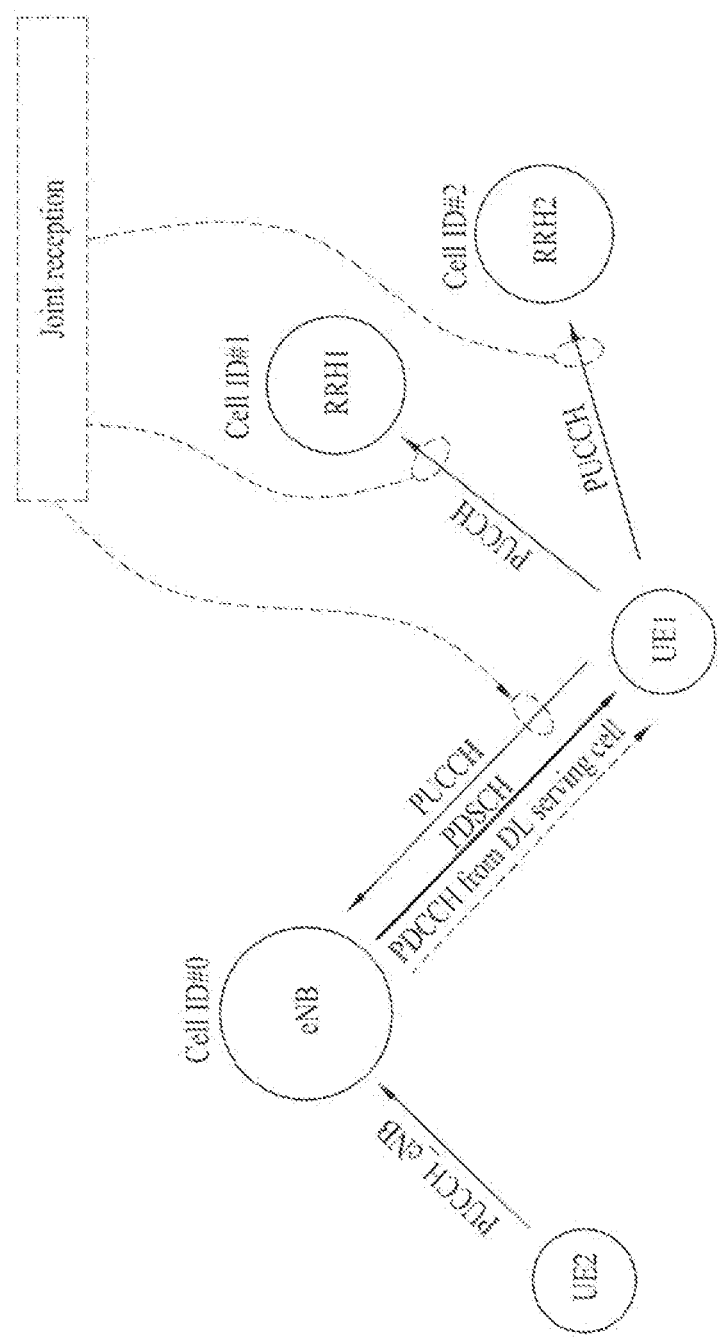
FIG. 10 illustrates an example in which an eNB and RRHs using the same cell ID participates in UL joint reception (JR).

FIG. 9 illustrates an example in which an eNB and RRHs using different cell IDs participate in UL DPS. FIG. 10 illustrates an example in which an eNB and RRHs using the same cell ID participate in UL JR.

In FIGS. 9 and 10, "PUCCH_eNB" indicates a PUCCH that a UE transmits towards an eNB, "PUCCH_RRHx" (where x=1 or 2) indicates a PUCCH that a UE transmits towards an RRHx (where x=1 or 2). Furthermore, "dynamic PUCCH_eNB" indicates a PUCCH resource allocated or determined based on a CCE index (hereinafter, an eNB CCE index) of an eNB ePDCCH, and "dynamic PUCCH_RRHx" (where x=1 or 2) indicates a PUCCH resource allocated or determined based on a CCE index (hereinafter, an RRH CCE index) of a PDCCH (hereinafter, an RRH PDCCH) transmitted by an RRHx (where x=1 or 2).

In FIGS. 9 and 10, DL PDSCH transmission may be performed by CoMP or non-CoMP. That is, a PUCCH resource for UL CoMP according to the present invention may be allocated not only in a non-CoMP situation in which only one transmitting device participates in DL transmission for a UE but also in a DL CoMP situation in which a plurality of transmitting devices simultaneously participates in DL transmission (in the case of JT) or some of the transmitting devices selectively participate in DL transmission (in the case of DL DPS). Hereinbelow, the embodiments of the present invention will be described under the assumption that, in DL CoMP, a CoMP serving cell is present and a PDCCH is transmitted from the CoMP serving cell. Meanwhile, it is assumed that a PDSCH may be transmitted from a plurality of points (eNBs or RRHs). From the viewpoint of a UE, there is a probability of receiving the PDSCH from a plurality of points and the UE is required to transmit ACK/NACK on the PDSCH. Hence, a cell ID combination in which a DL cell is different from a UL cell may be present.

Referring to FIG. 9, a network accessed by a UE may control configuration of the UE such that the UE performs UL DPS. The network may select an RP that is to receive a PUCCH of the UE and inform the UE of the selected RP. The UE may transmit one of PUCCH_eNB, PUCCH_RRH1, and PUCCH_RRH2 to the selected RP according to dynamic RP selection based on determination of the network.

Referring to FIG. 10, a network accessed by a UE may control configuration of the UE such that the UE performs JR. The UE may transmit PUCCH_eNB, PUCCH_RRH1 and PUCCH_RRH2, and each of an eNB, RRH1, and RRH2 may detect a PUCCH targeted therefor among the PUCCHs transmitted by the UE.

In FIGS. 9 and 10, the network may provide individual cell IDs of the eNB and RRHs communicating with the UE to the UE through at least the eNB or the RRHs (e.g. eNB).

Upon receiving a PDSCH together with a PDCCH from the eNB, UE1 transmits corresponding ACK/NACK on a PUCCH. According to the present invention, PUCCH resources are differently managed with respect to the case in which a target RP is an eNB and the case in which the target RP is an RRH, as illustrated in FIGS. 11 to 16.

Figure 11:
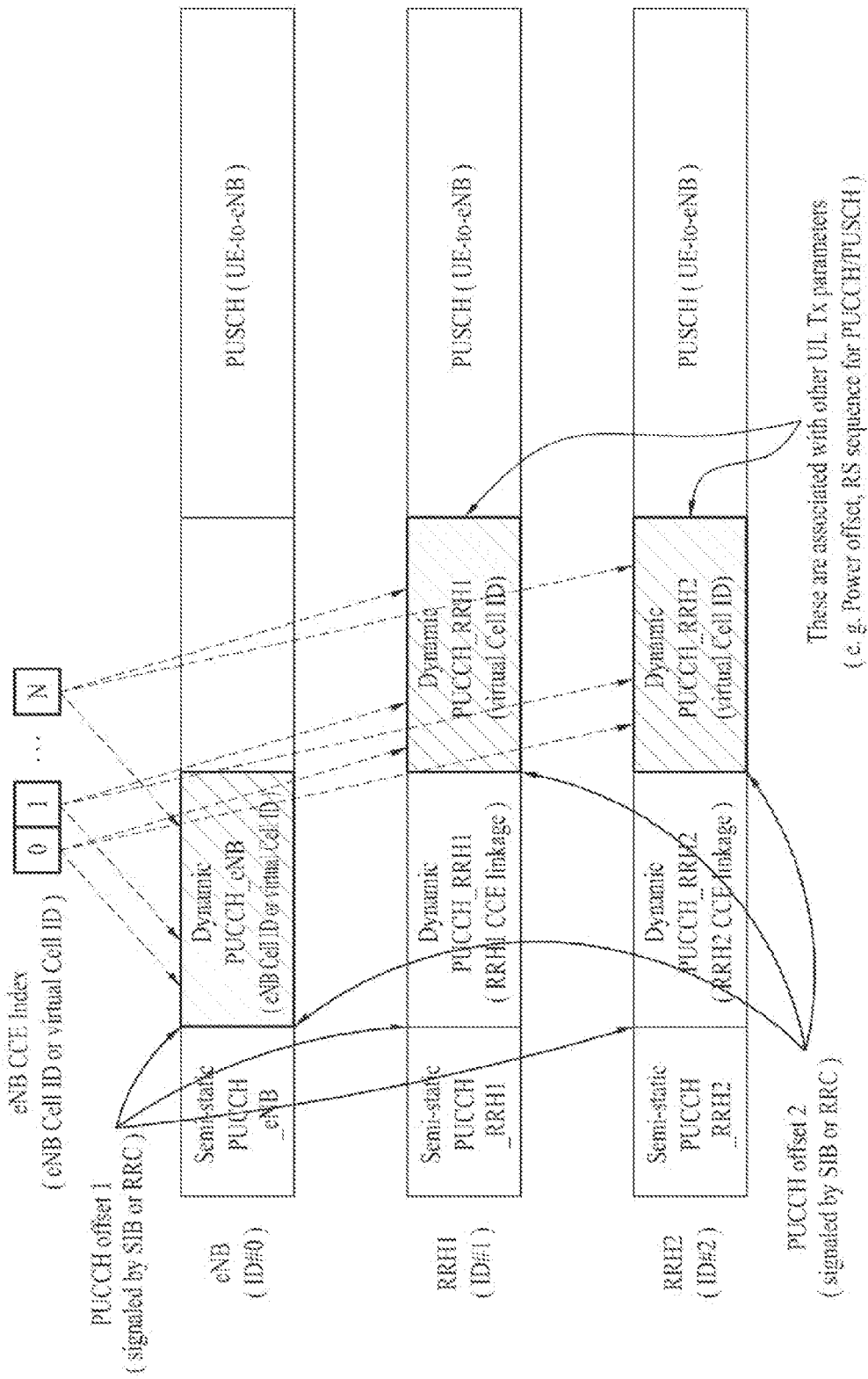
FIGS. 11 to 16 PUCCH resource management methods for reception points (RPs) using different cell IDs according to the present invention.
Figure 12:
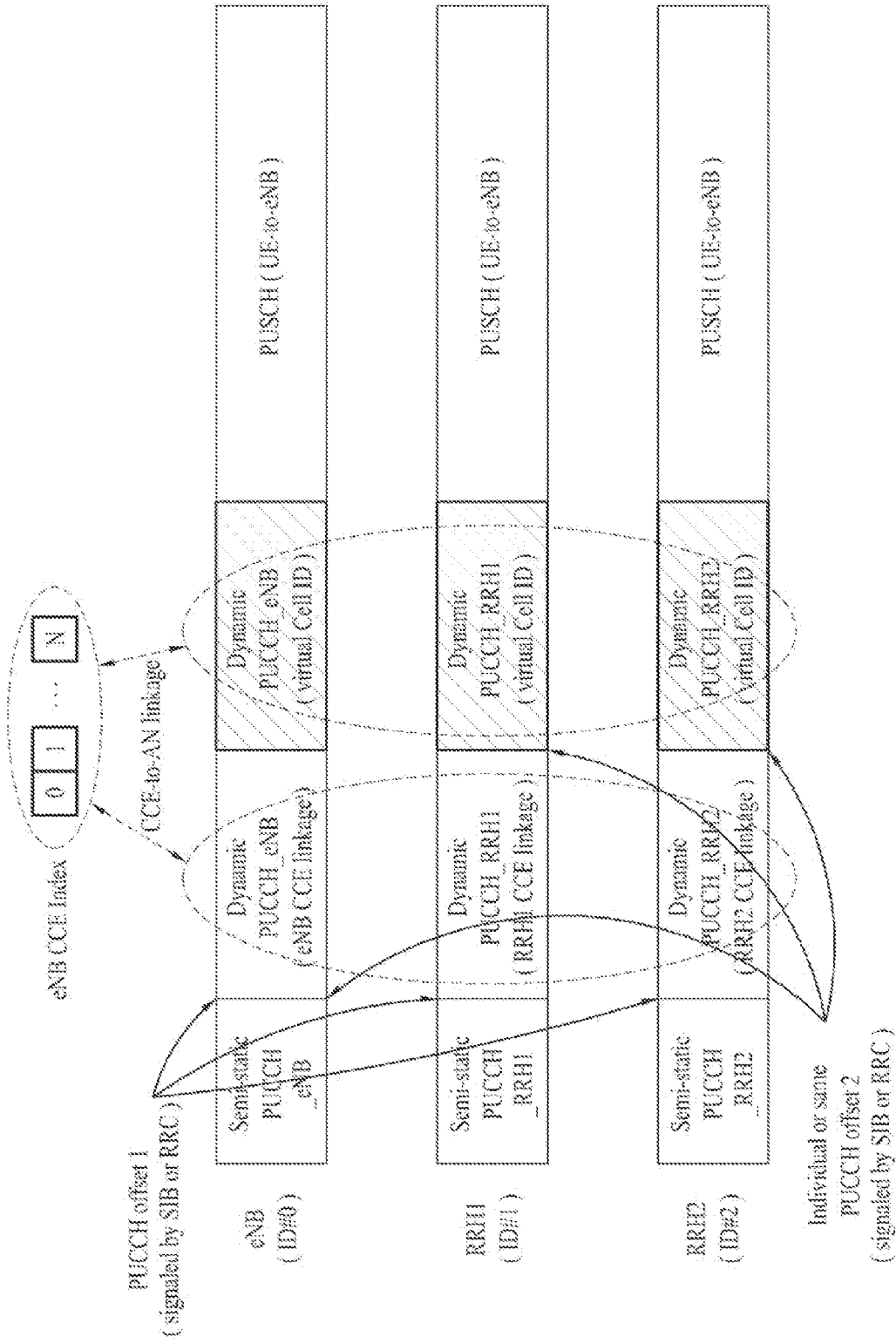
Figure 13:
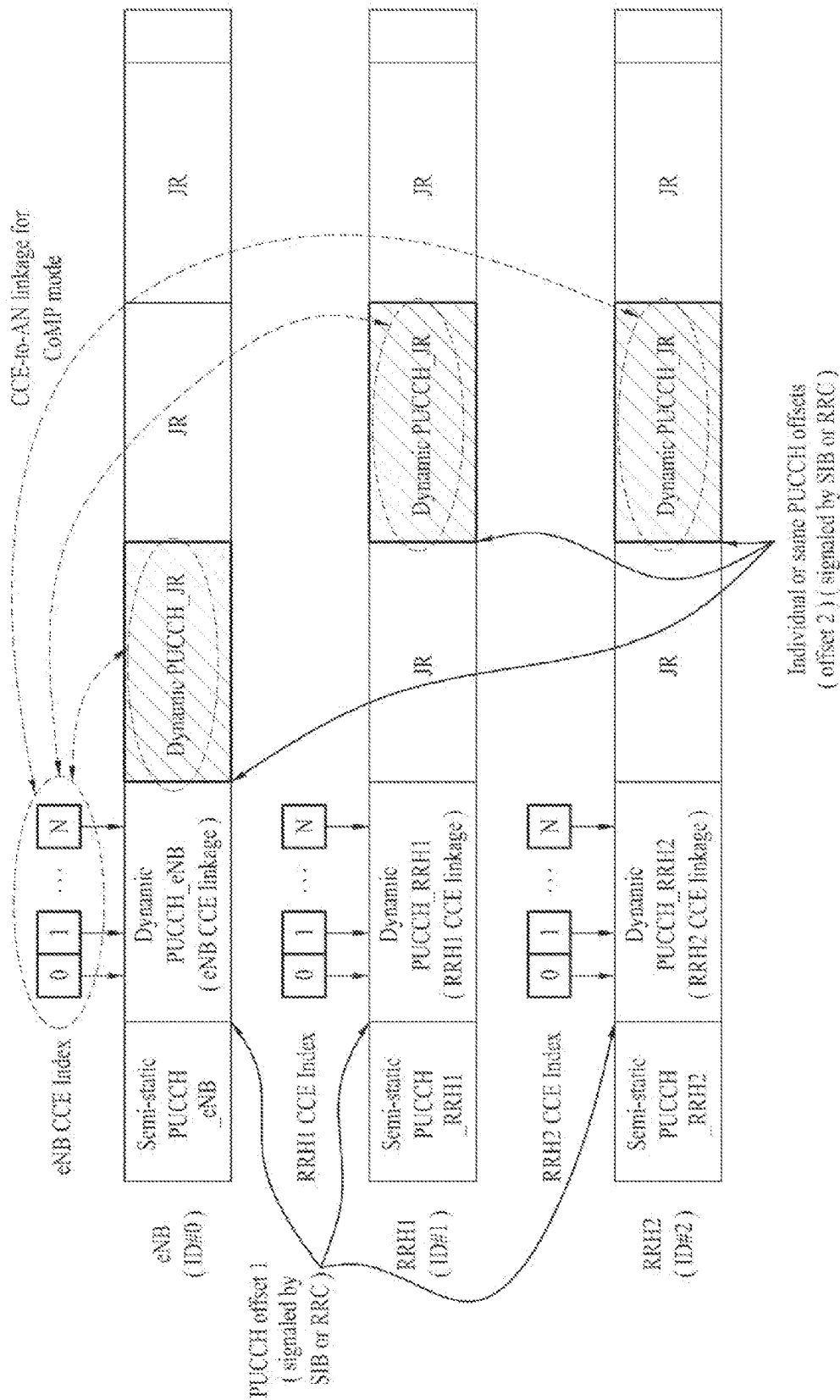
Figure 14:
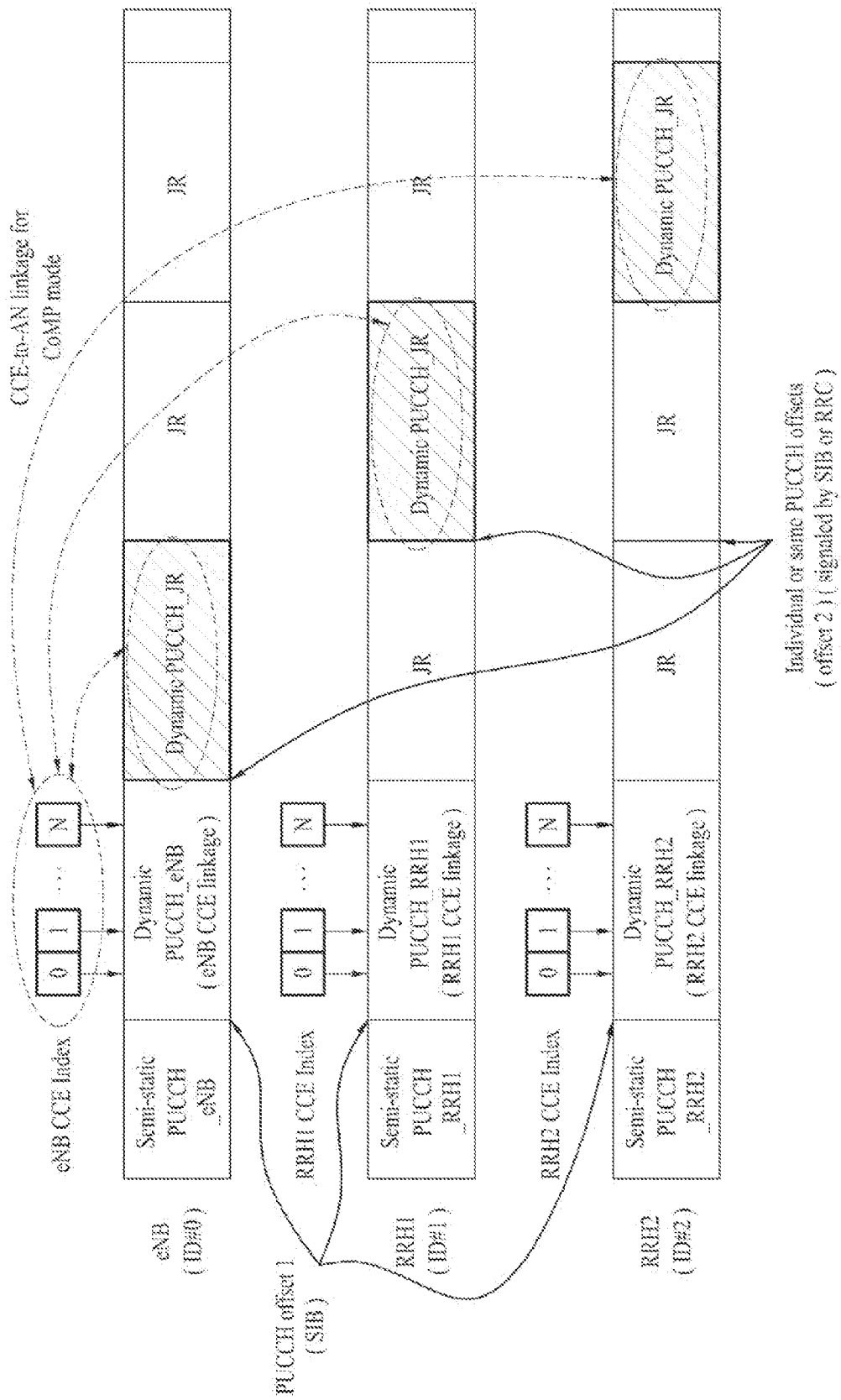
Figure 15:
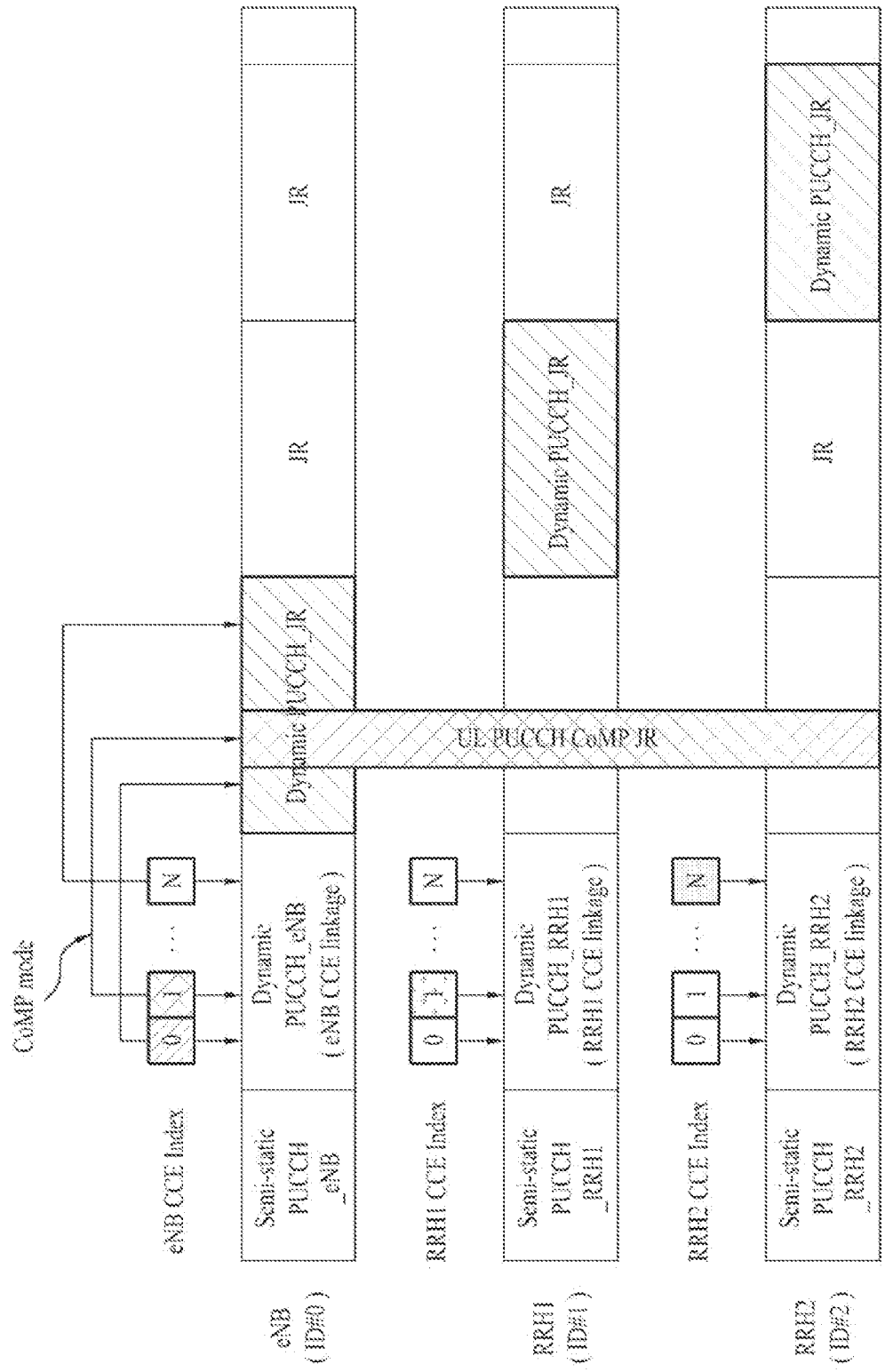
Figure 16:
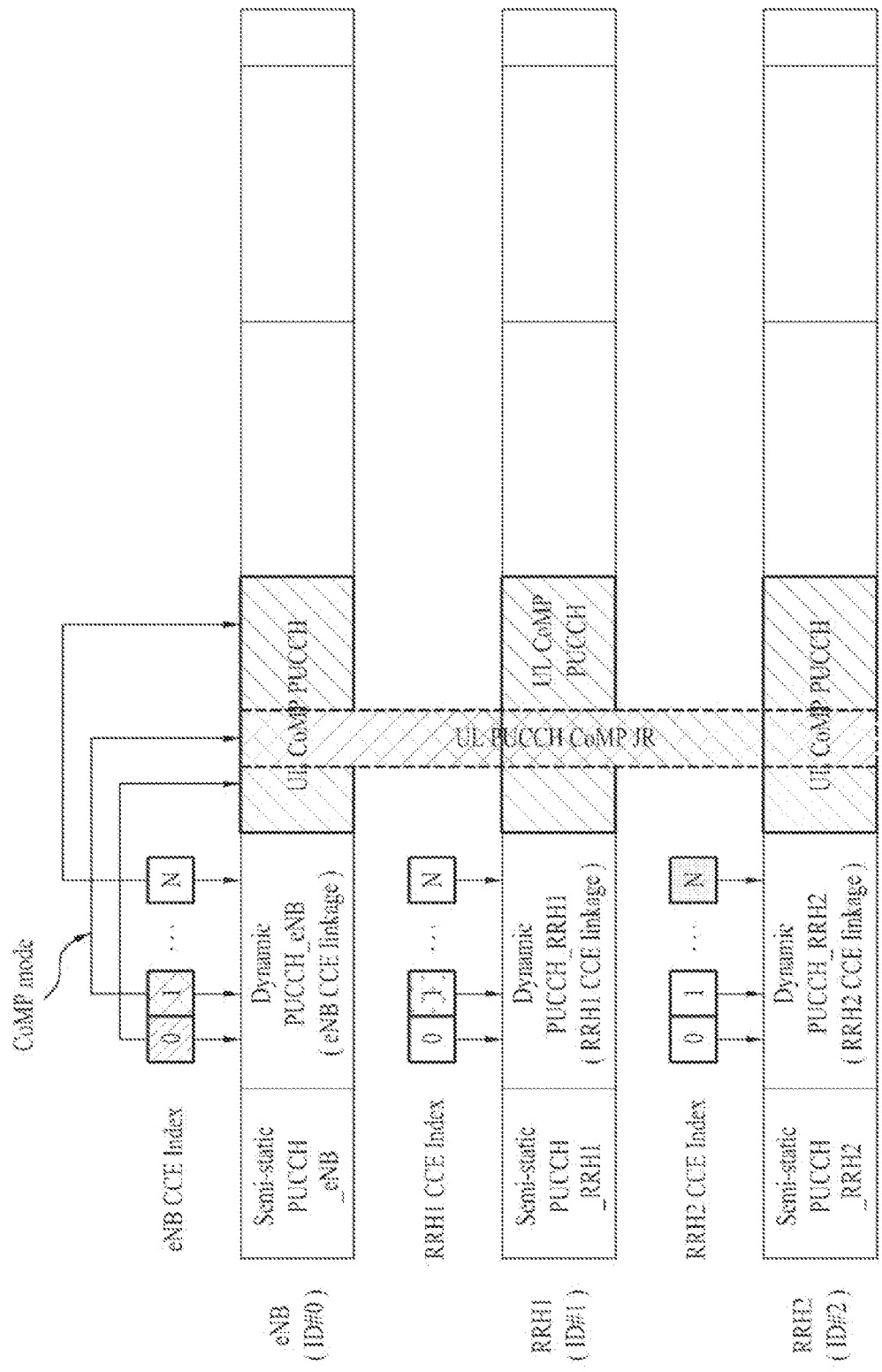

FIGS. 11 to 16 illustrate PUCCH resource management methods for RPs using different cell IDs according to the present invention. Particularly, FIGS. 11 and 12 illustrate embodiments favorable for CS/CB/DPS and FIGS. 13 and 14 illustrate embodiments favorable for JR. FIGS. 15 and 16 illustrate implementation examples of the embodiment of FIG. 14.

Referring to FIG. 9 or 10, when an RP is an eNB, if a PUCCH resource linked to an eNB CCE index is also used for UE1 that is a CoMP UE, collision between the PUCCH resource used by UE1 and a PUCCH resource used by UE2 that is a macro UE can be avoided. This is because the PUCCH resource used by UE1 for PUCCH transmission and the PUCCH resource used by UE2 for PUCCH transmission are generated based on the same cell ID and are allocated by the eNB to UE1 and UE2, respectively. For example, the eNB that transmits eNB PDCCHs such that PUCCH transmission of UE1 and PUCCH transmission of UE2 may be performed in the same subframe configures the eNB PDCCH for UE1 and the eNB PDCCH for UE2 to have different first CCEs, thereby preventing collision between the PUCCH resource of UE1 and the PUCCH resource of UE2.

However, if the RP is RRH1 or RRH2, then RRH1 and RRH2 independently manage PUCCH resources from the eNB, based on different cell IDs. Accordingly, among PUCCH resources generated for an RRH UE based on a cell ID of the RRH (hereinafter, an RRH cell ID), if a PUCCH resource linked to an eNB CCE is used for ACK/NACK transmission of UE2 towards RRH1 or RRH2, the PUCCH resource used by UE1 may collide with a PUCCH resource used by the RRH UE (hereinafter, RRH PUCCH resource). Conversely, if UE1 performs PUCCH transmission based on a cell ID of the eNB (hereinafter, eNB cell ID), collision between the PUCCH resource of UE1 and the PUCCH resource of the RRH UE can be prevented to some degree by a randomization effect. In this case, since RRH1 or RRH2 receives a PUCCH based on a cell ID different from the eNB cell ID, it may be substantially impossible for RRH1 or RRH2 to receive the PUCCH transmitted by UE1 or complexity of RRH1/RRH2 increases due to the necessity for RRH1 or RRH2 to additionally perform decoding or demodulation based on the eNB cell ID.

Accordingly, if a UE receiving a DL signal from an eNB is configured to perform PUCCH transmission towards an RRH, the present invention proposes that PUCCH resources available for PUCCH transmission of the UE towards the RRH be generated based on an RRH cell ID and a PUCCH resource region occupied by the PUCCH resources be pre-designated as a PUCCH resource region (hereinafter, a new dynamic PUCCH resource region) other than a PUCCH resource region linked to RRH CCEs (hereinafter, a legacy dynamic PUCCH resource region). In other words, the present invention proposes that a set of additional dynamic PUCCH resources be UE-specifically, UE group-specifically, or TM-specifically configured separately from a set of legacy dynamic PUCCH resources which are cell-specifically configured. For example, an eNB may configure the additional dynamic PUCCH resources by transmitting a UE-specific, UE group-specific, or TM-specific PUCCH resource offset to a UE separately from a cell-specifically provided PUCCH resource offset value (e.g. $N^{(1)}_{PUCCH}$). The legacy dynamic PUCCH resource region and the new dynamic PUCCH resource region of the present invention may not overlap or may partially overlap for efficient use of resources. The new dynamic PUCCH resource region according to the present invention may be associated with other UL Tx parameters (e.g. a power offset and an RS sequence for PUCCH/PUSCH).

In FIGS. 11 to 16, regions indicated by "Dynamic PUCCH_eNB (eNB Cell ID or virtual Cell ID)", "Dynamic PUCCH_(eNB CCE linkage)", "Dynamic PUCCH_RRH1 (RRH1 CCE linkage)", and "Dynamic PUCCH_RRH2 (RRH2 CCE linkage)" correspond to legacy dynamic PUCCH resource regions and regions indicated by "Dynamic PUCCH_RRH1 (virtual Cell ID)", "Dynamic PUCCH_RRH2 (virtual Cell ID)", "Dynamic PUCCH_eNB (virtual Cell ID)", "Dynamic PUCCH_JR", and "UL CoMP PUCCH" correspond to new RRH PUCCH resource regions according to the present invention. In addition, in FIGS. 11 to 16, "PUCCH offset1" corresponds to a legacy cell-specific PUCCH resource offset value (e.g. $N^{(1)}_{PUCCH}$) and "PUCCH offset2" corresponds to a UE-specific, UE group-specific, or TM-specific PUCCH resource offset value.

Additionally, the present invention proposes that a PUCCH resource actually used by a UE for PUCCH transmission towards an RRH be dynamically allocated by being linked to an eNB CCE index. In other words, according to the present invention, an eNB CCE is linked not to a PUCCH resource managed by an eNB or a PUCCH resource in a legacy dynamic PUCCH resource region of an RRH but to a PUCCH resource in a specific PUCCH resource region (e.g. a new dynamic PUCCH resource region) managed by the RRH. Namely, the eNB CCE index is linked to the PUCCH resource index in the new dynamic PUCCH resource region managed by the RRH rather than the PUCCH resource index in the legacy dynamic PUCCH resource region.

In terms of RRH1 or RRH2, a new dynamic PUCCH resource region for RRH1 and a new dynamic PUCCH resource region for RRH2 are mapped to eNB CCEs in one-to-one correspondence. However, in terms of eNB CCEs, since the eNB CCEs are mapped to PUCCH resource regions of a plurality of RPs, it may be said that the eNB CCEs are mapped to PUCCH resources in one-to-N correspondence.

Since a new dynamic PUCCH resource reserved for RRH1 and a new dynamic PUCCH resource reserved for RRH2 are configured based on different cell IDs, the resources may be formed in the same region as illustrated in FIGS. 11 to 13 and FIG. 16. However, as illustrated in FIGS. 14 and 15, a new dynamic PUCCH resource region may be independently configured with respect to each RRH in order to minimize interference between RRHs. The new dynamic PUCCH resource region may be designated by higher-layer signaling (e.g. RRC signaling) or physical layer signaling (e.g. system information block (SIB) signaling).

In FIGS. 11 and 12, an eNB CCE indicates an eNB cell ID or a virtual cell ID in some cases. The virtual cell ID is a cell ID which replaces a physical cell ID (e.g. $N^{cell}_{ID}$) or is allocated to a specific point separately from the physical cell ID. The virtual cell ID may be used to configure PUCCH resources for a corresponding cell together with or instead of the physical cell ID. In terms of an eNB, a CCE may be linked to a PUCCH resource based on an eNB cell ID or a PUCCH resource based on a virtual cell ID. In the embodiments of FIGS. 11 and 12, when it is assumed that an eNB covers all RRHs and a PDCCH is transmitted only from the eNB, each cell uses a PUCCH resource linked to a CCE based on a cell ID thereof in a non-CoMP mode, whereas each cell uses a PUCCH resource linked to a CCE based on a separate cell ID in a CoMP mode. This scheme is especially favorable for CS/CB/DPS. For reference, FIG. 11 illustrates the case in which a dynamic PUCCH_eNB resource linked to an eNB cell ID and a dynamic PUCCH_eNB resource linked to a virtual cell ID are designed to have the same PUCCH resource offset.

FIGS. 13 and 14 illustrate embodiments for managing a PUCCH resource especially in consideration of JR. Specifically, in a CoMP JR mode, an eNB uses an additional PUCCH resource offset (hereinafter, PUCCH resource offset2) instead of a legacy PUCCH resource offset (hereinafter, PUCCH resource offset1). Separate PUCCH resources for the CoMP JR mode may be simply reserved by a virtual cell ID and PUCCH resource offset2 may be transmitted by an eNB to a UE by RRC signaling or by SIB information. For reference, a signal transmission scheme of the present invention may be variously configured by physical layer signaling, medium access control (MAC) layer signaling, RRC layer signaling, etc. Meanwhile, RRHs may use respective PUCCH resources allocated in the CoMP JR mode by receiving individual PUCCH resource offsets (offset2).

FIG. 13 illustrates identically configured PUCCH resource offset2 for RRHs and FIG. 14 illustrates differently configured PUCCH resource offset2 for RRHs. A PUCCH resource offset for the CoMP JR mode may be achieved by UE-specific signaling.

In the case of JR, since a plurality of points simultaneously participates in reception, if a PUCCH is transmitted using a PUCCH resource based on a specific cell ID, all RPs should empty the same PUCCH resource. Referring to FIG.

15, when a UE transmits ACK/NACK by JR using a PUCCH resource linked to eNB CCE1 among PUCCH resources in a new dynamic PUCCH resource region, since RRH1 and RRH2 need to receive the ACK/NACK, the same PUCCH resource as the above PUCCH resource used by the eNB to receive the ACK/NACK should be emptied. In other words, if a PUCCH resource for one RP among RPs participating in JR is determined, the other RPs cannot use the PUCCH resource for other UCI transmission. In consideration of this fact, a dynamic PUCCH region for JR may be identically configured with respect to RPs participating in JR as illustrated in FIG. 16.

<Same Cell ID>

Figure 17:
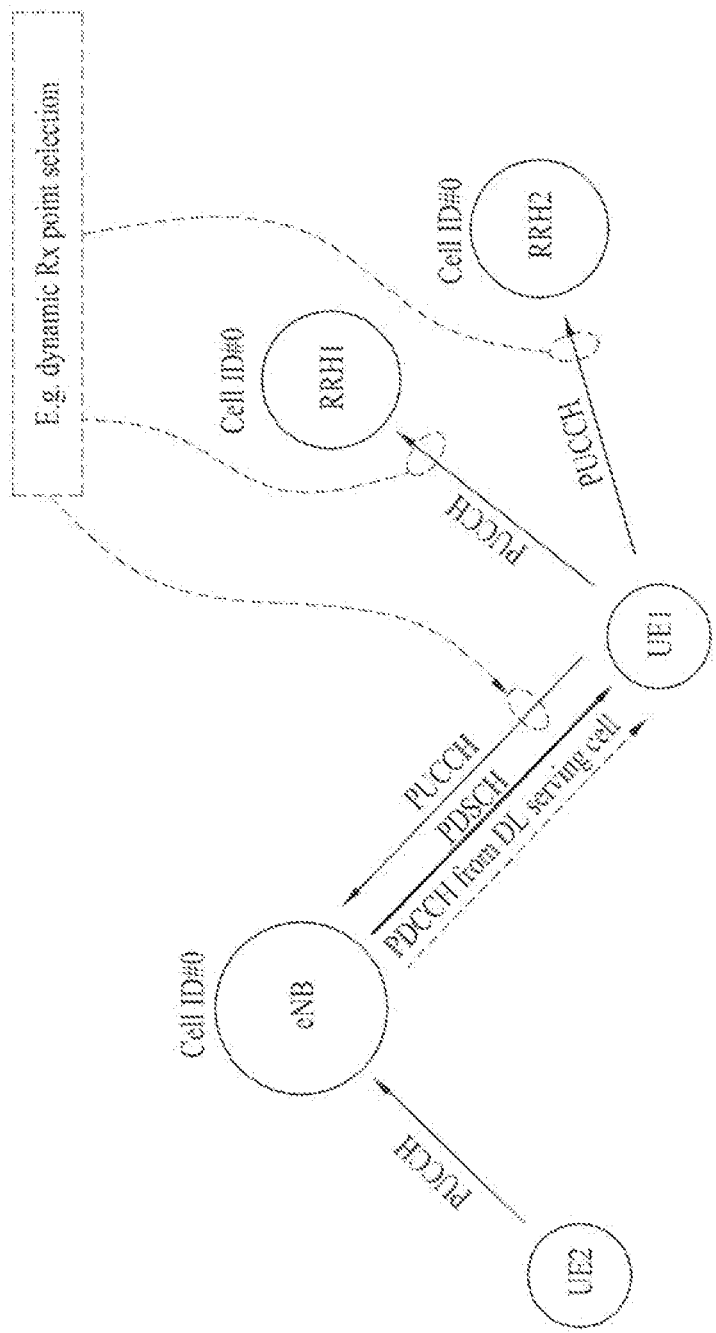
FIGS. 17 to 19 illustrate a CoMP situation of a heterogeneous network (HetNet) managed by the same cell ID of an eNB and RRHs.
Figure 18:
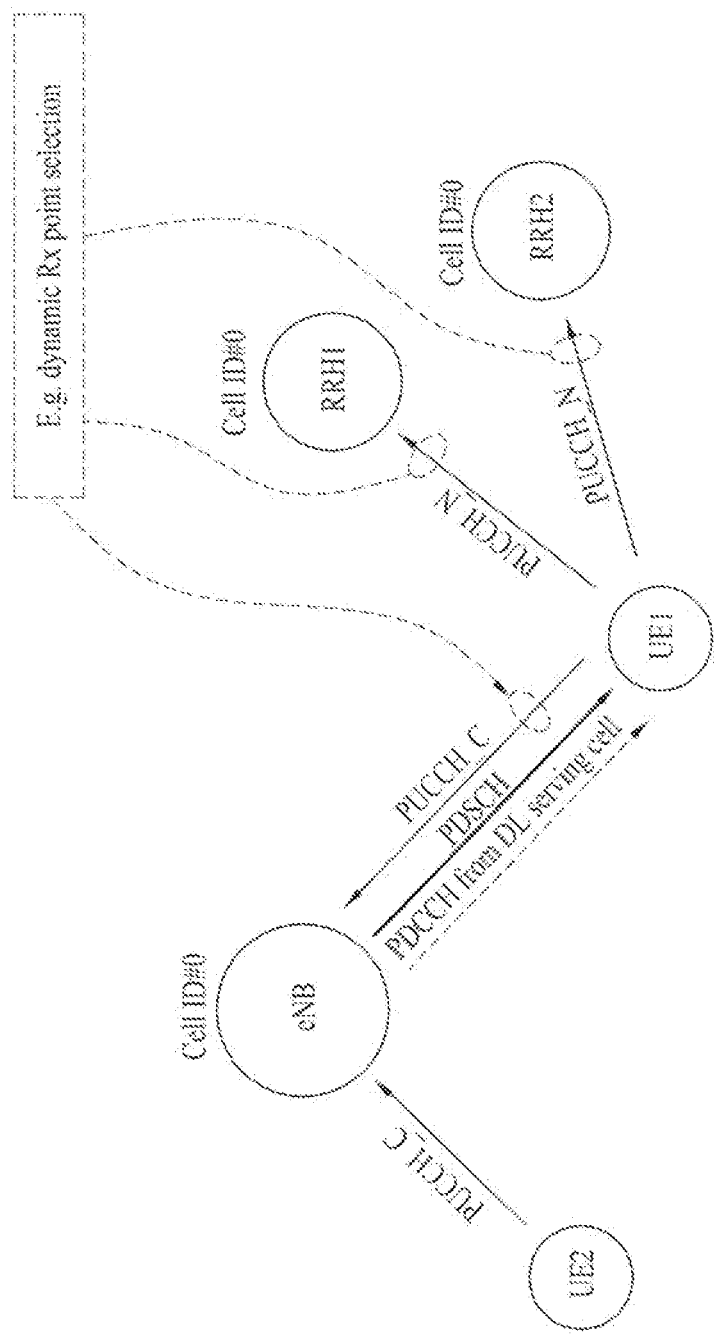
Figure 19:
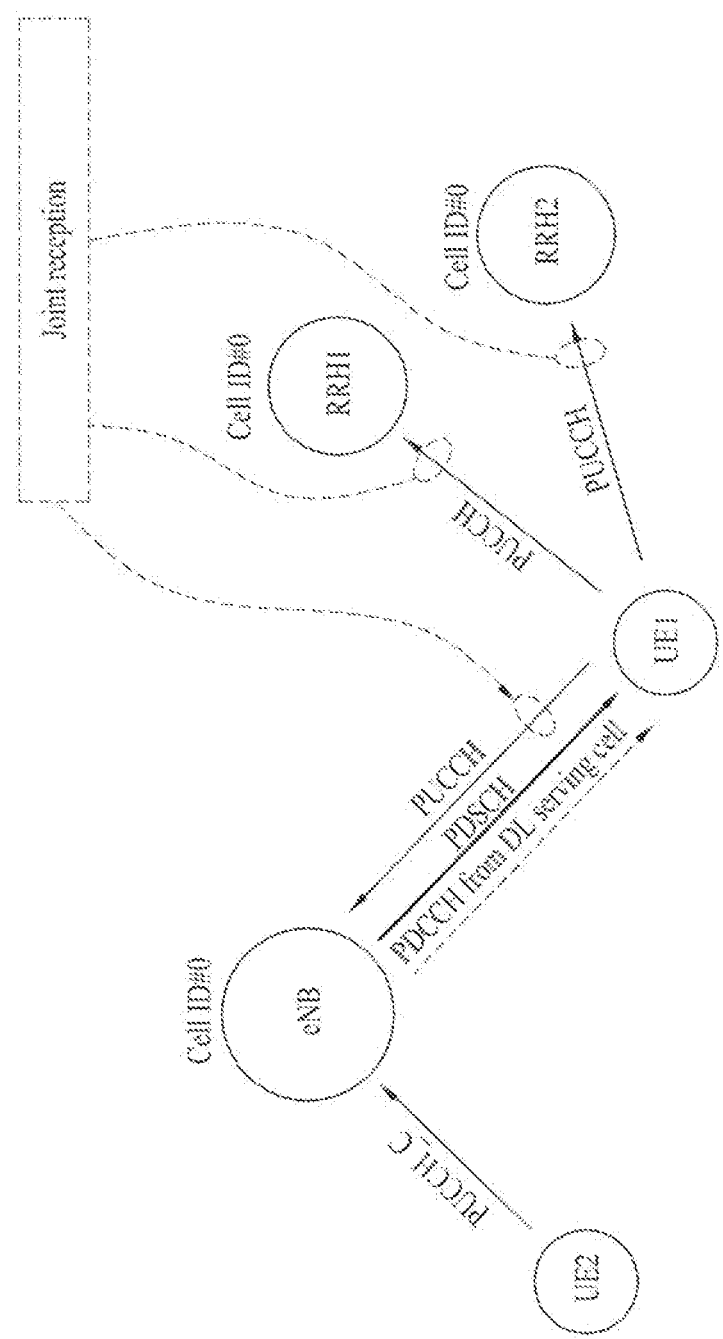
Figure 20:
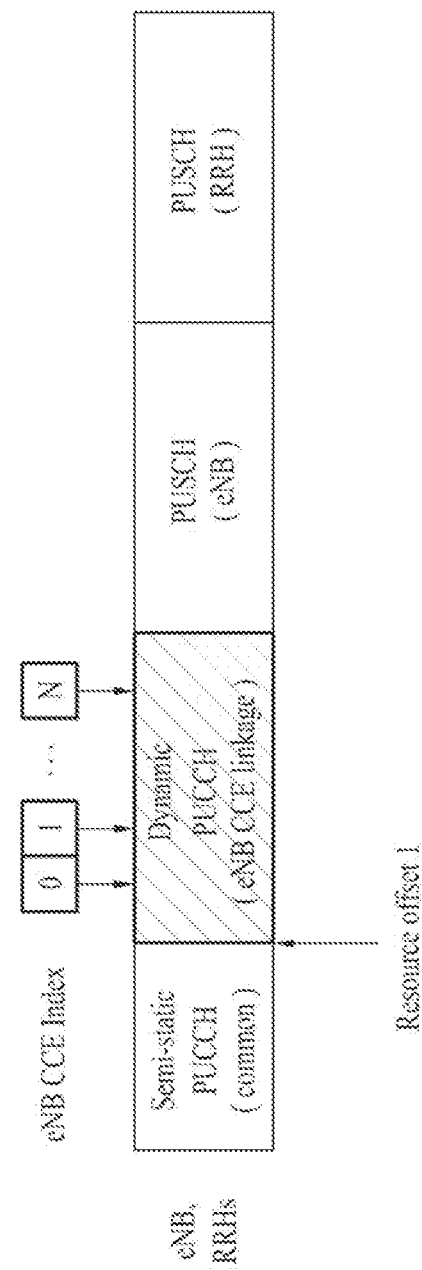
FIG. 20 illustrates legacy PUCCH resource allocation when RPs participating in UL CoMP share the same cell ID.

FIGS. 17 to 19 illustrate a CoMP situation of a HetNet managed by the same cell ID of an eNB and RRHs and FIG. 20 illustrates legacy PUCCH resource allocation when RPs participating in UL CoMP share the same cell ID.

A CoMP UE, UE1, may be configured to transmit ACK/NACK associated with a PDCCH received from an eNB towards a dynamically selected RP as illustrated in FIGS. 17 and 18 or may be configured to simultaneously transmit ACK/NACK to a plurality of RPs as illustrated in FIG. 19. In this case, referring to FIG. 20, UE1 transmits ACK/NACK using the same PUCCH resource irrespective of towards which one of an eNB, RRH1, and RRH2 ACK/NACK is to be transmitted. Form the viewpoint of an RP, CCE indexes used by the eNB, RRH1, and RRH2 are mapped to PUCCH resources in a PUCCH resource region having PUCCH resource offset1 as a start PUCCH resource in one-to-one correspondence by the same scheme. That is, in FIGS. 17 to 19, according to a conventional PUCCH resource allocation method, all of the eNB, RRH1 and RRH2 use one PUCCH resource. In this case, there are scheduling restrictions in that the eNB should allocate CCE indexes such that a PDCCH CCE index of UE2 does not overlap a PDCCH CCE index of UE1. However, even when a UE1-to-RRH1 PUCCH resource overlaps a UE2-to-eNB PUCCH resource, for example, if an interference level is weak because a UE1-to-RRH1 link is distant from a UE2-to-eNB link, one PUCCH resource may be reused in a cell formed by RPs using the same cell ID. However, even in this case, in order for the eNB to allocate the same CCE index to a plurality of UEs, there are scheduling restrictions in that an interference level affected by ULs formed between the multiple UEs and the eNB should be weak.

Figure 21:
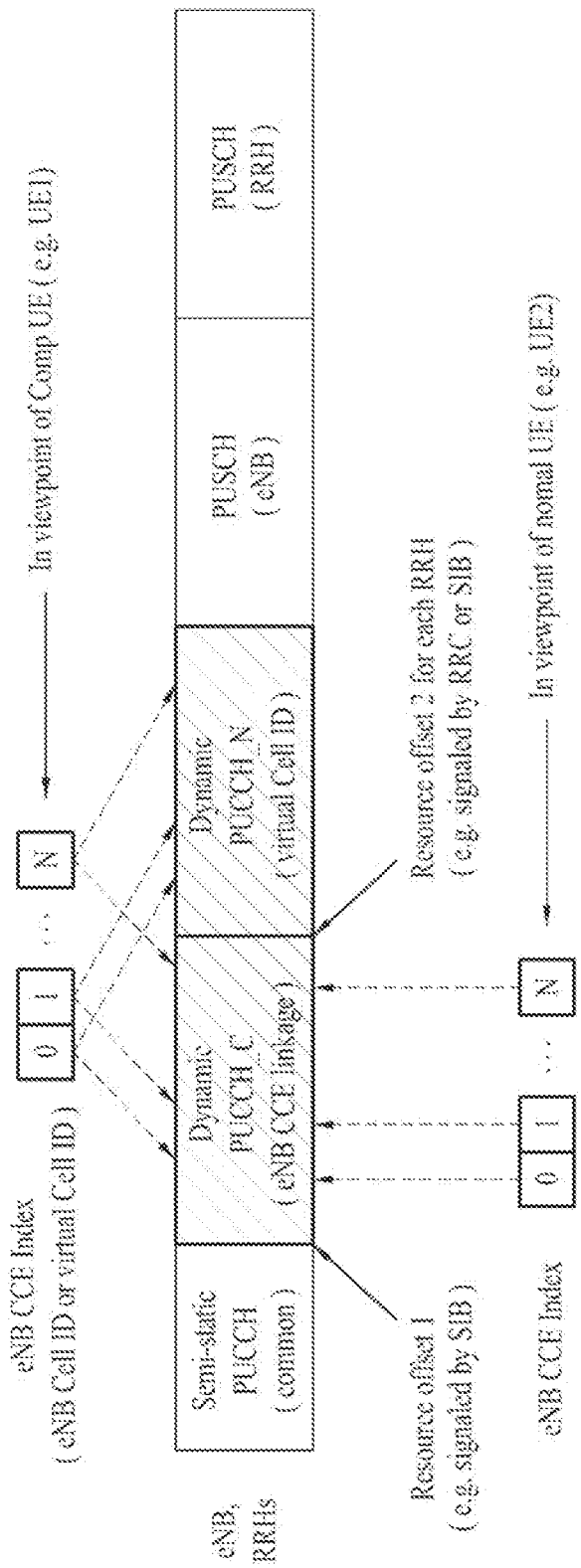
FIGS. 21 to 24 illustrate PUCCH resource allocation methods applicable to the CoMP situations of FIGS. 17 to 19.
Figure 22:
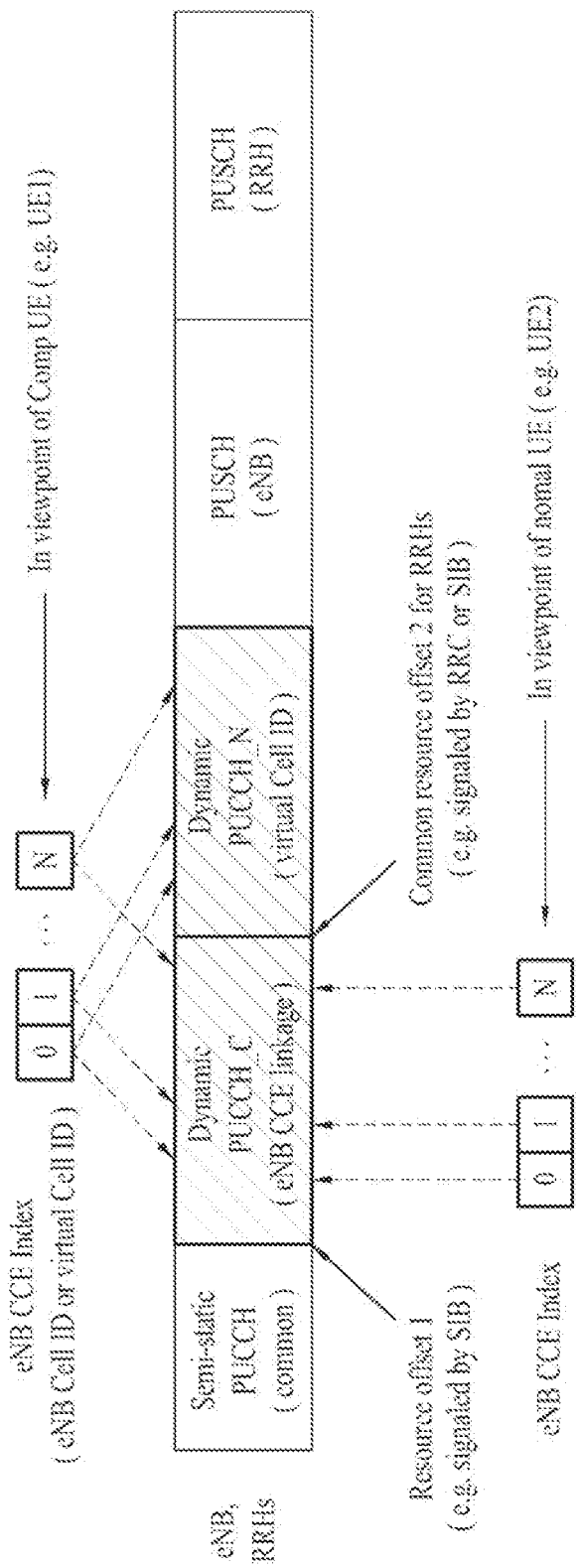
Figure 23:
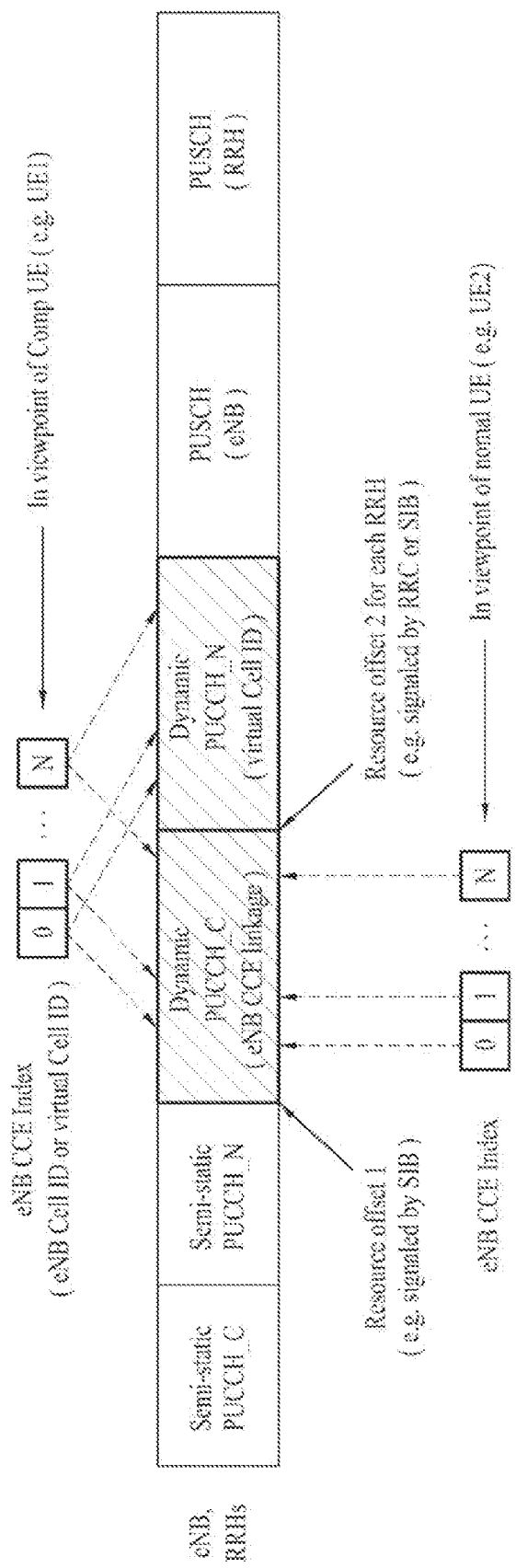
Figure 24:
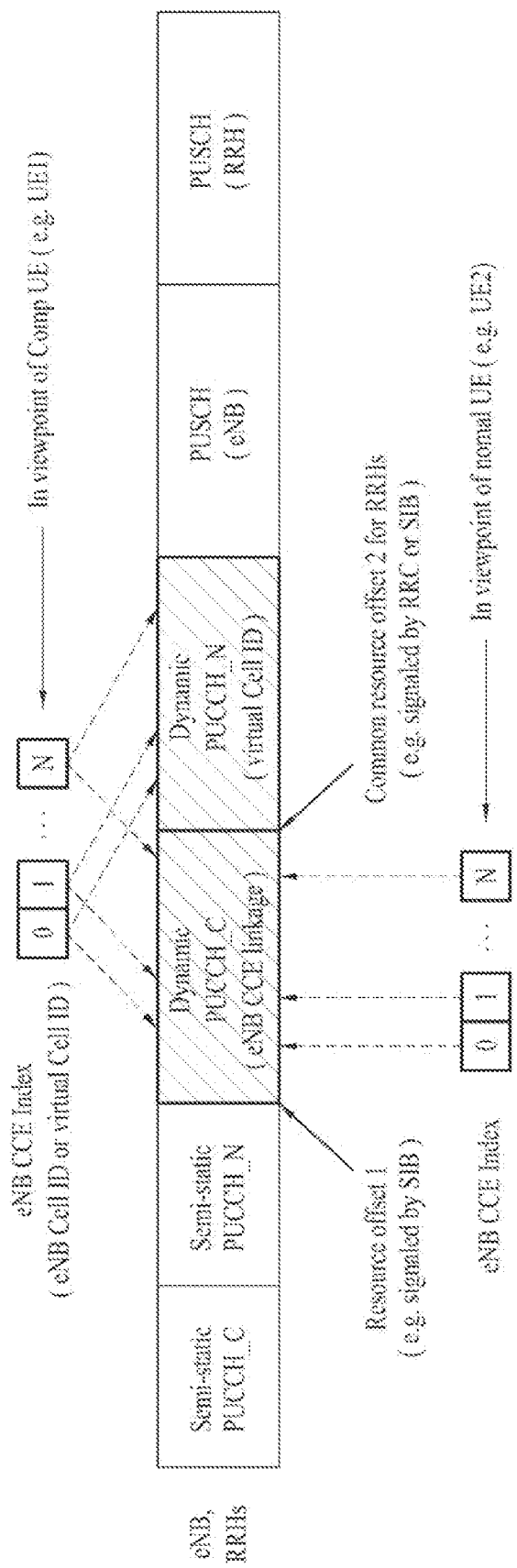

FIGS. 21 to 24 illustrate PUCCH resource allocation methods applicable to the CoMP situations of FIGS. 17 to 19. Specifically, FIGS. 21 and 22 illustrate embodiments for arranging an integrated semi-static PUCCH resource region for a normal UE and a special UE (e.g. CoMP UE). FIGS. 23 and 24 illustrate embodiments for arranging consecutive semi-static PUCCH resource region for a normal UE and a special UE (e.g. CoMP UE). FIGS. 23 and 24 illustrate arrangement of a semi-static PUCCH_C resource region for the normal UE and a semi-static PUCCH_N resource region for a special UE at a UL band edge. The embodiments of FIGS. 21 and 23 may be applied to, for example, CS/CB/DPS among CoMP operations and the embodiments of FIGS. 22 and 24 may be applied to, for example, JR among the CoMP operations.

From the viewpoint of the CoMP UE (e.g. UE1), an eNB CCE index is linked not only to a legacy dynamic PUCCH resource region but also to a separately reserved PUCCH resource region in some cases (e.g. the case in which a CoMP operation is performed). Obviously, at any timing point, a specific PUCCH resource in one of two PUCCH resource regions will have to be designated. However, if a PUCCH needs to be simultaneously transmitted towards different points, both PUCCH resource regions may be used.

For example, when UE1 operates in a normal mode, referring to FIGS. 21 and 24, a resource of dynamic PUCCH_C region is used and, when UE1 operates in a special mode (e.g. CoMP), a resource of dynamic PUCCH_N region is used. In this case, since a normal UE (e.g. UE2) uses the resource of dynamic PUCCH_C region as in a legacy UE, collision with UE1 does not occur.

In FIGS. 21 to 24, since PUCCH resource offset2 indicates a logical index although a PUCCH resource reserved by a special intention (e.g. dynamic PUCCH_N resource) may indicate a special resource block reserved using a higher-layer signal such as PUCCH resource offset2, an actually reserved PUCCH resource may be arranged on a UL band by being naturally combined with a legacy PUCCH resource.

In FIGS. 21 to 24, PUCCH resource offset1 may be obtained by SIB signaling and, similarly, PUCCH resource offset2 may also be obtained by SIB signaling. However, due to SIB signaling overhead, format change, etc., PUCCH resource offset2 may be signaled for an individual RRH through RRC signaling.

If a set of points participating in CoMP for a specific UE or UE group is referred to as a CoMP set, RRHs included in the same CoMP set have the same PUCCH resource offset2 in FIGS. 21 to 24. PUCCH resource offset1 is a resource shared by the eNB and RRHs and the UE may recognize PUCCH resource offset1 from an SIB.

In the CoMP situation of FIGS. 17 to 19, the amount of DCI that the eNB should transmit increases according to the number of RRHs. However, since the magnitude of a control region in which a PDCCH can be transmitted is the same as in a legacy region, PDCCH transmission functions as a bottleneck of system performance. Accordingly, in order to prevent PDCCH transmission from restricting system performance, PDCCH transmission using a PDSCH region of a DL subframe has been discussed. A legacy PDCCH transmitted in a PDCCH region is transmitted using resources over a wide frequency band in the frequency domain, whereas a PDCCH transmitted in a PDSCH region is typically transmitted using a narrow frequency band. Hereinafter, in order to distinguish a PDCCH transmitted in a PDSCH region of a DL subframe from a legacy PDCCH that can be located only on the front OFDM symbol(s) of the DL subframe, the former is referred to as an enhanced PDCCH (ePDCCH).

Figure 25:
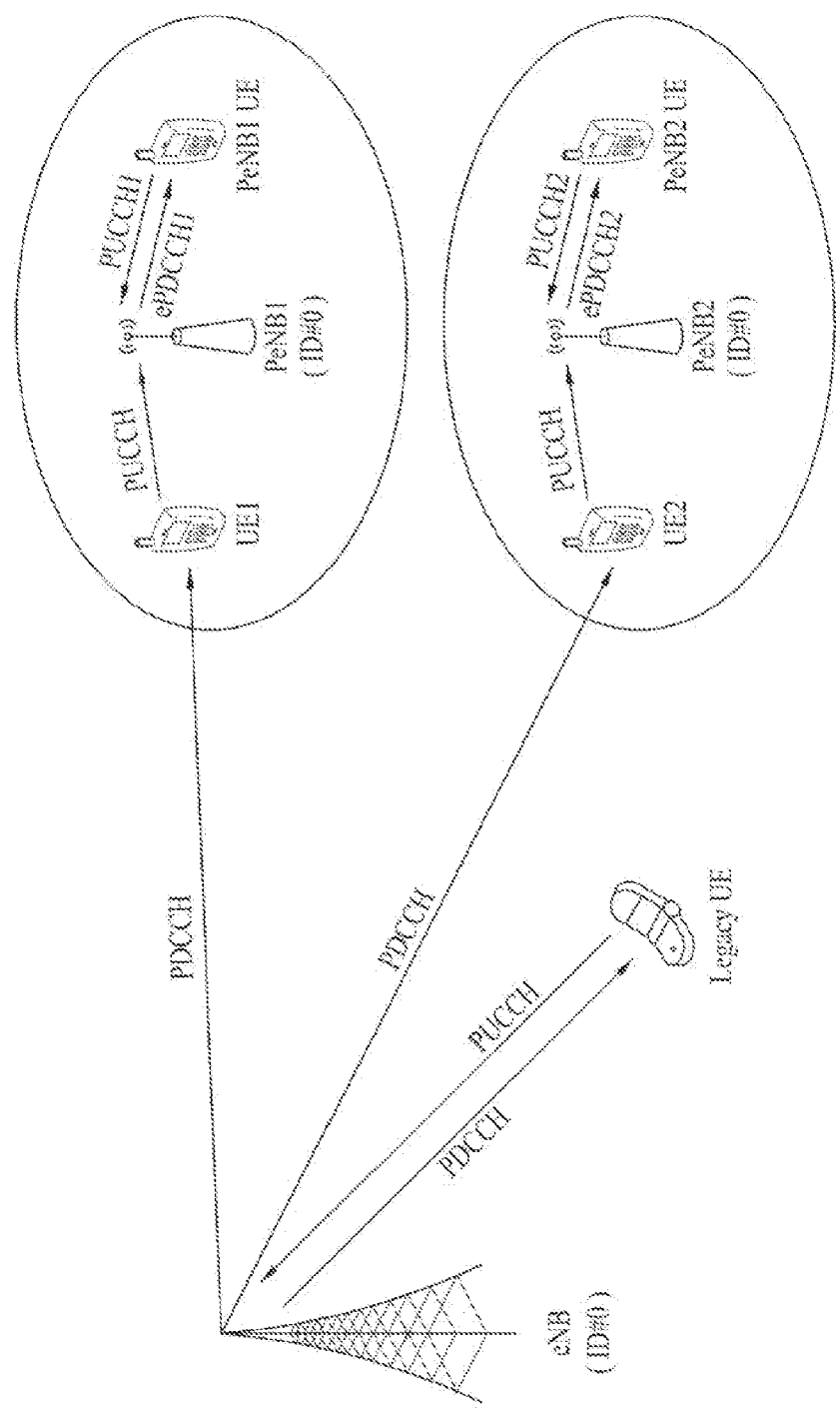
FIG. 25 illustrates exemplary PUCCH transmission corresponding to an ePDCCH in a CoMP situation in which RPs use the same cell ID.

FIG. 25 illustrates exemplary PUCCH transmission corresponding to an ePDCCH in a CoMP situation in which RPs use the same cell ID.

An eNB and an RRH may use an ePDCCH as well as a PDCCH. For example, referring to FIG. 25, a CoMP UE, UE1 or UE2, may receive DCI through an ePDCCH. That is, the CoMP UE may be scheduled by an ePDCCH transmitted by the eNB (hereinafter, eNB ePDCCH).

Figure 26:
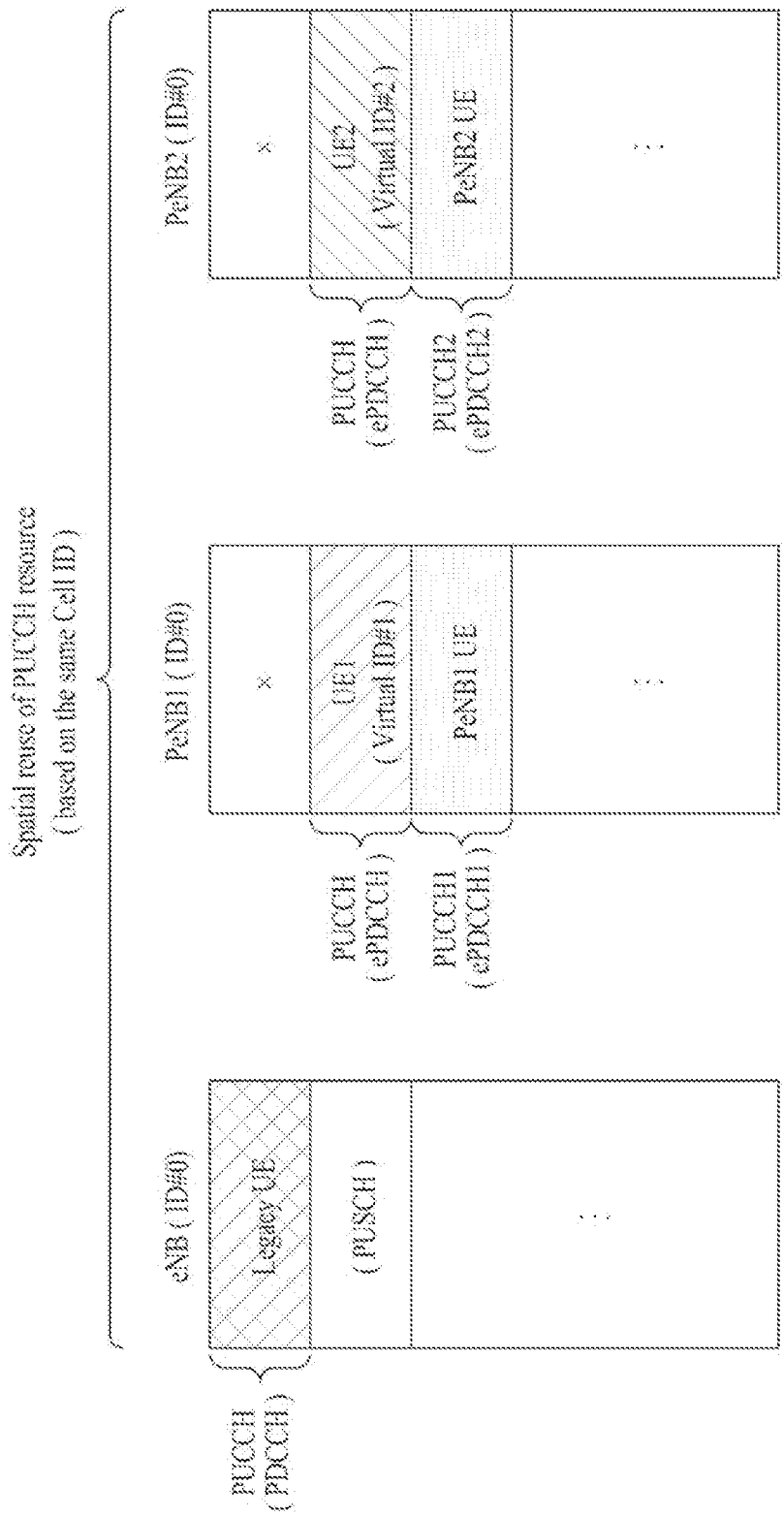
FIG. 26 illustrates exemplary PUCCH resource allocation for the CoMP situation of FIG. 25 according to the present invention.

FIG. 26 illustrates exemplary PUCCH resource allocation for the CoMP situation of FIG. 25 according to the present invention. In FIG. 26, "PUCCH (PDCCH)" indicates a PDCCH CCE-to-PUCCH ACK/NACK linkage and "PUCCH (ePDCCH)" indicates an ePDCCH CCE-to-PUCCH ACK/NACK linkage.

Referring to FIG. 26, a CCE index in an eNB ePDCCH (hereinafter, ePDCCH CCE index) may be linked to a PUCCH resource index generated based on a specially given cell ID (e.g. virtual cell ID). Each PeNB preferably uses a virtual cell ID thereof for interference randomization between cells. To avoid collision between a PUCCH of a CoMP UE and a PUCCH of a PeNB UE, each PeNB PUCCH resource is preferably used. Meanwhile, an eNB legacy UE will use a legacy PUCCH resource region associated with an eNB PDCCH, reserved separately from a PUCCH for a CoMP UE having an ePDCCH.

In the same was as described in FIG. 8, since cells (or an eNB and PeNBs) cooperatively reserve PUCCH resources of PUCCH format 2/3, the PUCCH resources of PUCCH format 2/3 semi-statically configured by an RRC signal may be shared by the CoMP UE and the PeNB UE. Additionally, as mentioned in FIG. 8, a legacy PUCCH resource linked to a PDCCH is used for a legacy UE, a DL cell and a UL cell of which are the same, and a new PUCCH resource linked to the PDCCH is used for a CoMP UE, a DL cell and a UL cell of which are different. To avoid collision between a PUCCH resource for a CoMP UE scheduled by the eNB is separately reserved from a PUCCH resource for a PeNB UE scheduled by the PeNB.

UL DPS entails an operation of frequently changing a target RP of UL transmission. If the target RP has a cell ID different from a legacy cell ID, PUCCH transmission and PUSCH transmission corresponding to the changed target cell should be performed. Since resource allocation in linkage with a cell ID is performed for PUCCH transmission, it is necessary for a UE to differently generate a PUCCH resource depending upon towards which point a PUCCH is to be transmitted, as described previously. Accordingly, the UE should be configured to generate the PUCCH resource according to a cell ID of a target RP to which a PUCCH is to be transmitted. Meanwhile, since path loss varies with the target RP, it is desirable to differently set a power control offset. Accordingly, the present invention proposes UL power control per RP. If a set of points that the UE can dynamically select is a DPS set, the UE should be aware of a PUCCH/PUSCH/SRS power control offset per cell ID included in the DPS set and the UE may determine which channel of which cell corresponds to the power control offset every UL transmission moment to apply the determined power control offset to UL transmission to a corresponding cell. The eNB may pre-configure a plurality of power control offsets and signals the configured power control offsets to the UE. The eNB may dynamically or explicitly indicate a corresponding power control offset among the plural power control offsets so that the UE may perform UL transmission by applying the corresponding power control offset. Alternatively, the UE may select one power control offset among the plural power control offsets according to a prescribed condition and apply the selected power control offset to UL transmission. Upon detecting DCI for a CoMP TM, the UL may be configured to apply such an operation to a PUCCH resource reserved for CoMP. That is, upon detecting the DCI for the CoMP TM, the UE may perform PUCCH transmission using a PUCCH resource linked to a CCE of a PDCCH carrying the DCI in a new dynamic PUCCH resource region in the above-described embodiments of the present invention. The PUCCH resource reserved for CoMP may be reserved by PUCCH resource offset1, which is a PUCCH resource offset for a legacy dynamic PUCCH resource, in terms of one cell. As described above, when UL DPS is performed, PUCCH resource offset2 may be configured per multiple target RPs.

Meanwhile, a DPS set including an RRH having the same cell ID as an eNB may be configured. If all RPs in the DPS set have the same cell ID, all of the RPs in the DPS set may share the same PUCCH resources even if PUCCHs are transmitted towards different RPs. Notably, in consideration of the fact that a UL Tx power level varies as the distance with a UE differs according to an RP, PUCCH resources using a similar UL Tx power may be collectively allocated to each RP. In this case, a PUCCH resource region per RP may be distinguished by a PUCCH resource offset. A legacy DCI field such as a carrier indicator field (CIF) may be reused or a new DCI format may be defined to configure an indicator field in the new DCI format, so that a target RP point may be indicated to the UE. Alternatively, a PUCCH resource may be determined depending upon a DCI format. For example, a DCI format may be defined per RP or an indicator field indicating a target RP obtained through decoding may be present although a DCI format of the same length is used for all RPs, thereby determining a PUCCH resource region.

In a 3GPP LTE system, a UE is configured to perform blind-decode up to two DCI formats according to TM. In this case, the UE will basically perform blind decoding with respect to a fallback DCI format (e.g. DCI format 1A) and a TM dependent DCI format. In the present invention, upon detecting a DCI format designated to achieve a special purpose such as CoMP or a newly introduced DCI format, the UE performs a pre-designated operation. UL Tx parameter(s), indicating towards which RP the UE is to perform UL transmission, for which cell UL transmission is targeted for, and which cell ID will be used to perform UL transmission, may be pre-designated. In addition, selection of PUSCH transmission parameter(s) indicating a PUSCH DMRS used by the UE, selection of SRS transmission parameter(s) indicating a sequence or an RB used for an SRS for transmission, and selection of PUCCH transmission parameter(s) indicating a resource (a CS/OCC, an RB, hopping, or an ID) used for a PUCCH may be pre-designated. A parameter set may be pre-designated and the UE may be configured to use the pre-designated parameter set. Here, an eNB may pre-designate a plurality of parameter sets for the UE by higher layer (e.g. RRC) signaling and cause the UE to select one or some of the parameter sets so as to be used for UL transmission. If multiple parameter sets are configured by higher layer signaling, the UE may be configured to use a parameter set linked to specific DCI upon detecting the specific DCI. If there is one DCI format for the plural parameter sets, the UE may be configured to select one of the parameter sets using additional information included in the DCI format. That is, parameter sets reserved for a corresponding DCI format are determined according to the DCI format and a parameter set used for actual transmission among the parameter sets may be dynamically indicated to the UE by DCI transmitted through a PDCCH. Information indicating a parameter set to be applied to actual UL transmission among the reserved parameter sets, may be transmitted to the UE from the eNB by reusing a CIF introduced for carrier aggregation. In carrier aggregation, the CIF is used to indicate a CC for which scheduling information is carried by corresponding DCI. The CIF may be used to indicate a parameter set instead of a CC. If the CIF is used to indicate a parameter set rather than a CC, the CIF may be used as a type of activation signal. For example, if a DCI format for CoMP is DCI format X and CoMP is configured, PUCCH resources associated with DCI format X are pre-reserved and parameters related to DCI format X are pre-configured. However, the PUCCH resources and parameters associated with DCI format X are simply reserved without being used and the reserved PUCCH resources and parameters are used when DCI format X is detected by the UE. That is, the reserved PUCCH resources and parameters are activated by an additional field of DCI such as a CIF together with DCI format X. A PUCCH resource region may be implicitly determined according to a subframe instead of the CIF. For instance, when subframes in which many PUCCH resources for CoMP are reserved are periodically configured, if an eNB informs the UE of the start location and configuration period of the subframes in which many PUCCH resources for CoMP are reserved, the UE may use a PUCCH resource for CoMP in the subframes of a corresponding period and use a legacy PUCCH resource in other subframes.

Meanwhile, an additional indication signal other than the DCI may be used to indicate which of the reserved resources or parameters will be used. For example, the eNB may imply that pre-reserved resources and parameters are used by transmitting DCI format X and inform the UE which resource and parameter should be used among the reserved resources and parameters, through an additional indication signal. Upon detecting DCI format X, the UE may recognize that the pre-reserved resources and parameters can be used and which resource and parameter should be used for UL transmission.

In the above-described embodiments of the present invention, if a CoMP UE receives a PDCCH and a PDSCH associated with the PDCCH from the eNB and transmits a PUCCH for the PDSCH towards the eNB, the CoMP UE may transmit the PUCCH using a PUCCH resource linked to a PDCCH CCE carrying a DL grant for the PDSCH among PUCCH resources in a legacy dynamic PUCCH resource region. That is, the CoMP UE transmitting a PUCCH towards an RP which is the same as a TP may transmit the PUCCH using a legacy PUCCH resource. The CoMP UE may set the first CCE index of the PDCCH to $n_{CCE}$ of Equation 8 or 9 and set PUCCH resource offset to $N^{(1)}_{PUCCH}$ of Equation 8 or 9, thereby determining a PUCCH resource. Meanwhile, if the CoMP UE transmits a PUCCH towards a point different from a point transmitting a PDCCH, the CoMP UE may be configured to transmit the PUCCH using a PUCCH resource pre-reserved for other points. For example, the CoMP UE may determine a PUCCH resource by setting the first CCE index of the PDCCH to $n_{CCE}$ of Equation 8 or 9 and setting PUCCH resource offset2 to $N^{(1)}_{PUCCH}$ of Equation 8 or 9. Although the PUCCH resource has been described as an example, this example may be similarly applied to a transmission parameter and resource of another channel. For instance, a new DMRS sequence other than a legacy DMRS sequence may be configured and which one of the legacy DMRS sequence and the new PUSCH DMRS sequence will be used may be included in DCI format X or may be determined by an indication signal transmitted separately from DCI format X. Particularly, the newly configured DMRS sequence may be mainly used for a UL RP (i.e. a UL cell) having a different index (e.g. a different physical cell ID or different virtual cell ID) from a DL TP (i.e. DL cell). Conversely, the newly configured DMRS may be used in a cell of a DL TP and the legacy DMRS sequence may be used in a UL cell different from the DL cell.

A dynamic switch/indication mode between pre-reserved parameter sets or a dynamic switch/indication mode between pre-reserved PUCCH resource regions may be indicated by higher-layer (e.g. RRC) signaling. As an example, if the dynamic switch/indication mode is deactivated by higher-layer signaling, a parameter set and a PUCCH resource region for a specific TM (e.g. CoMP mode) may be semi-statically configured and the UE may perform UL transmission using the parameter set and/or PUCCH resource region. Meanwhile, if only one parameter set is UE-specifically configured, the UE regards this as a semi-static mode and may be configured to perform UL transmission by applying the corresponding parameter set. If a plurality of RRC parameter sets is UE-specifically configured, the UE may regard this as dynamic switching between the parameter sets and may be configured to perform dynamic switching between the parameter sets.

If a DL cell is different from a UL cell, a target UL cell may be designated using a CIF. This situation may be generated when cells of different size such as a heterogeneous network (HetNet) coexist. For example, if DL cell 1 transmits PDSCH1 to a UE and the UE transmits a PUCCH for PDSCH1 to UL cell 2 (in this case, generally, a PUSCH is also transmitted to UL cell 2), an eNB may indicate that UL cell 2 is a target RP of UL transmission to the UE. The eNB may indicate a target UL cell to the UE using a CIF value in a DCI format. An additional signaling bit for performing such an indication function may be added to the DCI format instead of the CIF.

The above-described embodiments may be applied to a DCI format of other TMs as well as to a DCI format for a CoMP mode. For example, a PUCCH resource may be reserved for a fallback DCI format according to a conventional rule and additional dynamic PUCCH resources according to the present invention may be configured for a DCI format according to a TM. Upon detecting the fallback DCI format, the UE may determine a dynamic PUCCH resource according to the conventional rule and, upon detecting a TM-dependent DCI format according to a corresponding TM, the UE may determine a dynamic PUCCH resource among the additionally configured PUCCH resources. In other words, the embodiments of the present invention may be applied not only to a DCI format for a CoMP mode but also to a general TM-dependent DCI format.

Figure 27:
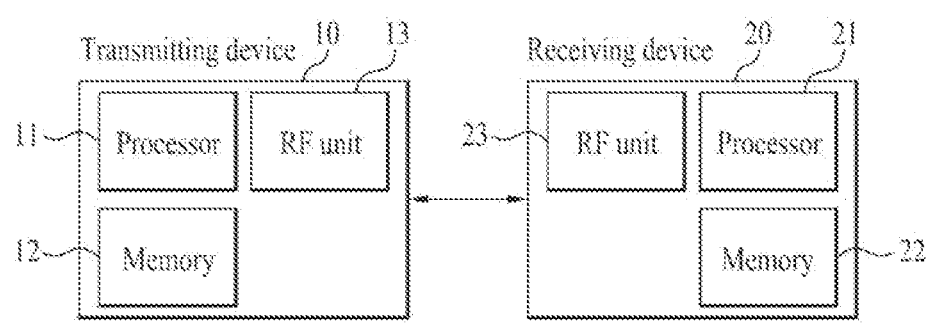
FIG. 27 is a block diagram illustrating elements of a transmitting device 10 and a receiving device 20 for implementing the present invention.

FIG. 27 is a block diagram illustrating elements of a transmitting device 10 and a receiving device 20 for implementing the present invention.

The transmitting device 10 and the receiving device 20 respectively include radio frequency (RF) units 13 and 23 capable of transmitting and receiving radio signals carrying information, data signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processor 11 and 21 may be referred to as controllers, microcontrollers, microprocessors, or microcomputers. The processor 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of it represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the embodiments of the present invention, a UE operates as the transmitting device 10 in UL and as the receiving device 20 in DL. In the embodiments of the present invention, an eNB operates as the receiving device 20 in UL and as the transmitting device 10 in DL. Hereinafter, the processor, RF unit, and memory included in the UE will be referred to as a UE processor, a UE RF unit, and a UE memory, respectively, and the processor, RF unit and memory unit included in the eNB will be referred to as an eNB processor, an eNB RF unit, and an eNB memory, respectively.

According to the embodiments of the present invention, the eNB processor generates a PDCCH and/or a PDSCH and controls the eNB RF unit to transmit the generated PDCCH and/or PDSCH, and the UE processor controls the UE RF unit to receive the PDCCH and/or PDSCH. According to the embodiments of the present invention, the UE processor generates a PUCCH, a PUSCH, a PUCCH DMRS, a PUSCH DMRS, and/or an SRS and controls the eNB RF unit to transmit the generated PUCCH, PUSCH, PUCCH DMRS, PUSCH DMRS, and/or SRS, and the eNB processor controls the eNB RF unit to receive the PUCCH, PUSCH, PUCCH DMRS, PUSCH DMRS, and/or SRS. In the present invention, each RP/TP may include at least an RF unit. If CoMP is configured, a DL TP may be different from a UL RP. However, since points participating in CoMP will be controlled by one eNB processor or by coordinated eNB processors, the embodiments of the present invention will be described using the expression that the same eNB transmits a DL signal and received a UL signal, when at least one of points participating in CoMP transmits the DL signal to a UE and at lease one of points participating in CoMP receives the UL signal from the UE. For example, even when an eNB transmitting a DL signal is different from an eNB receiving a UL signal, the embodiments of the present invention will be described using the expression that the same eNB transmits the DL signal and receives the UL signal according to the present invention. However, the embodiments of the present invention are applicable to the case in which an eNB transmitting a DL signal is different from an eNB receiving a UL signal.

The eNB processor according to the present invention configures a plurality of PUCCH resource regions per RP. For example, the eNB processor allocates a PUCCH resource for ACK/NACK transmitted towards the same point as a point transmitting a DL signal and a PUCCH resource for ACK/NACK transmitted towards a different point from a point transmitting the DL signal to the separately configured dynamic PUCCH resource regions. The eNB processor may generate the PUCCH resource for ACK/NACK transmitted towards the same point (hereinafter, point 1) as a point transmitting a DL signal, using $N^{cell}_{ID}$ (hereinafter, cell ID#1) of the same point. The eNB processor may generate the PUCCH resource for ACK/NACK transmitted towards a different point (hereinafter, point 2) from a point transmitting the DL signal, using a virtual cell ID (hereinafter, cell ID#2) allocated to point 2. If point 2 has $N^{cell}_{ID}$ different from cell ID#1, the eNB processor may use $N^{cell}_{ID}$ of point 2 as cell ID#2. The eNB processor may control the eNB RF unit to transmit, to the UE, PUCCH resource offset1, which is information indicating the location of a PUCCH resource region (hereinafter, PUCCH resource region 1) for ACK/NACK transmitted towards point 1 or transmitted in a cell (hereinafter, cell 1) of point 1, and PUCCH resource offset2, which is information indicating the location of a PUCCH resource region (hereinafter, PUCCH resource region 2) for ACK/NACK transmitted towards point 2 or transmitted in a cell (hereinafter, cell 2) of point 2, in all PUCCH resources managed by the eNB processor. PUCCH resource offset1 may correspond to the start PUCCH resource index of PUCCH resource region 1 and PUCCH resource offset2 may correspond to the start PUCCH resource index of PUCCH resource region 2. The eNB processor may control the eNB RF unit to transmit information about PUCCH resource offset1, cell ID#1, PUCCH resource offset 2, and cell ID#2 to the UE. The UE RF unit receives the information about PUCCH resource offset1, cell ID#1, PUCCH resource offset 2, and cell ID#2 from the eNB and transmits the information to the UE processor.

The eNB processor allocates a PDCCH to be transmitted to the UE based on the information about PUCCH resource offset1, cell ID#1, PUCCH resource offset 2, and cell ID#2 to CCE(s). The eNB processor configures the PDCCH using one or more CCEs and controls the eNB RF unit to transmit DCI to the UE through the PDCCH. If the DCI is DL grant, the eNB processor may control the eNB RF unit to transmit DL data to the UE through a PDSCH according to the DL grant.

The UE processor may control the UE RF unit to receive the DCI through a PDCCH thereof. If the DCI is a DL grant, the UE processor may control the UE RF unit to receive DL data through a PDSCH according to the DL grant. The UE processor may generate an ACK/NACK signal corresponding to the PDCCH and control the UE RF unit to transmit the ACK/NACK signal to at least one of points included in a CoMP set. If the UE/eNB operates in a DPS mode, the eNB processor may dynamically select one of the points in the CoMP set and control the eNB RF unit to transmit information indicating the selected point to the UE. TM information, information indicating one of PUCCH resource offsets, information indicating one of cell IDs which can be used to generate a PUCCH resource, and information indicating the selected point.

The UE processor controls the UE RF unit to transmit ACK/NACK through the PUCCH towards the selected point. If the UE/eNB operates in a JR mode, the UE processor controls the UE RF unit to transmit ACK/NACK through the PUCCH towards all points in the CoMP set. The UE processor may generate ACK/NACK to indicate DTX when the UE has failed to decode the PDCCH, ACK when the UE has succeeded in decoding the PDSCH, and NACK when the UE has failed to decode the PDSCH.

The UE processor may determine an index of PUCCH resource 1 for ACK/NACK transmitted towards point 1, based on PUCCH resource offset1 and a specific CCE (e.g. first CCE) index of the PDCCH. The UE processor may control the UE RF unit to transmit ACK/NACK using PUCCH resource 1. The UE processor may generate PUCCH resource 1 using cell ID#1. The UE processor may determine an index of PUCCH resource 2 for ACK/NACK transmitted towards point 2, based on PUCCH resource offset2 and the specific CCE index. The UE processor may control the UE RF unit to transmit ACK/NACK using PUCCH resource 2. The UE processor may generate PUCCH resource 2 using cell ID#2.

The eNB processor controls the eNB RF unit to receive ACK/NACK in cell 1, based on PUCCH resource offset 1, the specific CCE index, and cell ID#1. The eNB processor may detect ACK/NACK using PUCCH resource 1 among a plurality of cell ID#1 based PUCCH resources included in PUCCH resource region 1, based on PUCCH resource offset 1 and the specific CCE index. The eNB processor controls the eNB RF unit to receive ACK/NACK in cell 2, based on PUCCH resource offset 2, the specific CCE index, and cell ID#2. The eNB processor may detect ACK/NACK using PUCCH resource 2 among a plurality of cell ID#2 based PUCCH resources included in PUCCH resource region 2, based on PUCCH resource offset2 and the specific CCE index.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The embodiments of the present invention are applicable to a BS, an RN, a UE, or other devices in a wireless communication system.

The invention claimed is:

1. A method for transmitting an uplink signal by a user equipment (UE) in a wireless communication system, the method comprising:
   receiving, by the UE, downlink control information through a physical downlink control channel (PDCCH) including one or more control channel elements (CCEs) from a first cell;
   transmitting, by the UE, acknowledgment (ACK)/negative ACK (NACK) information associated with the PDCCH through a physical uplink control channel (PUCCH) of a carrier,
   wherein the ACK/NACK information is transmitted using a first PUCCH resource $nPUCCH\_1 = nCCE + NPUCCH\_1$ among a plurality of PUCCH resources configured on the carrier, where $NPUCCH\_1$ is a first offset configured by a radio resource control (RRC) layer and nCCE is a lowest CCE index of the PDCCH, when the UE is not configured to transmit the PUCCH using a second cell ID separate from a first cell ID of the first cell,
   wherein the ACK/NACK information is transmitted using a second PUCCH resource $nPUCCH\_2 = nCCE + NPUCCH\_2$ among the plurality of PUCCH resources configured on the carrier, where $NPUCCH\_2$ is a second offset configured by the RRC layer and nCCE is the lowest CCE index of the PDCCH, when the UE is configured to transmit the PUCCH using the second cell ID, and
   wherein the second offset is separate from the first offset; and
   receiving, by the UE, the first offset, the first cell ID, the second offset, and the second cell ID.

2. A user equipment (UE) for transmitting an uplink signal in a wireless communication system, the UE comprising:
   a radio frequency (RF) unit; and
   a processor configured to control the RF unit to:
   receive downlink control information through a physical downlink control channel (PDCCH) including one or more control channel elements (CCEs) from a first cell, and
   transmit acknowledgment (ACK)/negative ACK (NACK) information associated with the PDCCH through a physical uplink control channel (PUCCH) of a carrier,
   wherein the ACK/NACK information is transmitted using a first PUCCH resource $nPUCCH\_1 = nCCE + NPUCCH\_1$ among a plurality of PUCCH resources configured on the carrier, where $NPUCCH\_1$ is a first offset configured by a radio resource control (RRC) layer and nCCE is a lowest CCE index of the PDCCH, when the UE is not configured to transmit the PUCCH using a second cell ID separate from a first cell ID of the first cell, wherein the ACK/NACK information is transmitted using a second PUCCH resource nPUCCH_2=nCCE+NPUCCH_2 among the plurality of PUCCH resources configured on the carrier, where NPUCCH_2 is a second offset configured by the RRC layer and nCCE is the lowest CCE index of the PDCCH, when the UE is configured to transmit the PUCCH using the second cell ID, wherein the second offset is separate from the first offset, and wherein the RF unit further receives the first offset, the first cell ID, the second offset, and the second cell ID.

3. A method for receiving an uplink signal by a base station (BS) in a wireless communication system, the method comprising:

transmitting, by the BS, downlink control information through a physical downlink control channel (PDCCH) including one or more control channel elements (CCEs) on a first cell to a user equipment (UE);

receiving, by the BS, acknowledgment (ACK)/negative ACK (NACK) information associated with the PDCCH through a physical uplink control channel (PUCCH) of a carrier from the UE, wherein the ACK/NACK information is received using a first PUCCH resource nPUCCH_1=nCCE+NPUCCH_1 among a plurality of PUCCH resources configured on the carrier, where NPUCCH_1 is a first offset configured by a radio resource control (RRC) layer and nCCE is a lowest CCE index of the PDCCH, when the UE is not configured to transmit the PUCCH using a second cell ID separate from a first cell ID of the first cell, wherein the ACK/NACK information is received using a second PUCCH resource nPUCCH_2=nCCE+NPUCCH_2 among the plurality of PUCCH resources configured on the carrier, where NPUCCH_2 is a second offset configured by the RRC layer and nCCE is the lowest CCE index of the PDCCH, when the UE is configured to transmit the PUCCH using the second cell ID, and wherein the second offset is separate from the first offset; and transmitting, by the BS, the first offset, the first cell ID, the second offset, and the second cell ID.

4. A base station (BS) for receiving an uplink signal in a wireless communication system, the BS comprising:

a radio frequency (RF) unit; and a processor configured to control the RF unit to:

transmit downlink control information through a physical downlink control channel (PDCCH) including one or more control channel elements (CCEs) on a first cell to a user equipment (UE), and receive acknowledgment (ACK)/negative ACK (NACK) information associated with the PDCCH through a physical uplink control channel (PUCCH) of a carrier from the UE, wherein the ACK/NACK information is received using a first PUCCH resource nPUCCH_1=nCCE+NPUCCH_1 among a plurality of PUCCH resources configured on the carrier, where NPUCCH_1 is a first offset configured by a radio resource control (RRC) layer and nCCE is a lowest CCE index of the PDCCH, when the UE is not configured to transmit the PUCCH using a second cell ID separate from a first cell ID of the first cell, wherein the ACK/NACK information is received using a second PUCCH resource nPUCCH_2=nCCE+NPUCCH_2 among the plurality of PUCCH resources configured on the carrier, where NPUCCH_2 is a second offset configured by the RRC layer and nCCE is the lowest CCE index of the PDCCH, when the UE is configured to transmit the PUCCH using the second cell ID, wherein the second offset is separate from the first offset, and wherein the RF unit further transmits the first offset, the first cell ID, the second offset, and the second cell ID.

* * * * *